(12) United States Patent  
Njasure et al.

(10) Patent No.: US 12,061,706 B2  
(45) Date of Patent: Aug. 13, 2024

(54) ENCRYPTED FILE CONTROL

(71) Applicant: Keyavia Data Corp, Durango, CO (US)

(72) Inventors: Prashant Shripad Njasure, Irving, TX (US); Elliot Daniel Lewis, Las Vegas, NV (US)

(73) Assignee: Keyavi Data Corp., Durango, CO (US)

( * ) Notice: Subject to any disclaimer, the term of this patent is extended or adjusted under 35 U.S.C. 154(b) by 206 days.

(21) Appl. No.: 17/482,010

(22) Filed: Sep. 22, 2021

(65) Prior Publication Data

US 2022/0092193 A1 Mar. 24, 2022

Related U.S. Application Data

(60) Provisional application No. 63/081,763, filed on Sep. 22, 2020.

(51) Int. Cl.
| | |
|---|---|
| *G06F 21/62* | (2013.01) |
| *G06F 21/60* | (2013.01) |
| *H04L 9/14* | (2006.01) |
| *G06F 21/71* | (2013.01) |
| *G06F 21/78* | (2013.01) |
| *H04L 9/08* | (2006.01) |

(52) U.S. Cl.
CPC ........ *G06F 21/602* (2013.01); *G06F 21/6218* (2013.01)

(58) Field of Classification Search
None
See application file for complete search history.

(56) References Cited

U.S. PATENT DOCUMENTS

| 8,560,785 | B1* | 10/2013 | Malhotra | G06F 21/6218 |
| | | | | 711/162 |
| 8,910,278 | B2* | 12/2014 | Davne | H04L 63/0272 |
| | | | | 726/1 |
| 10,798,073 | B2* | 10/2020 | Jahid | H04L 63/0807 |
| 2003/0154381 | A1* | 8/2003 | Ouye | G06F 21/6227 |
| | | | | 713/182 |
| 2005/0071657 | A1* | 3/2005 | Ryan | G06F 21/6218 |
| | | | | 713/193 |
| 2008/0162931 | A1* | 7/2008 | Lord | H04L 63/061 |
| | | | | 713/165 |
| 2017/0039383 | A1* | 2/2017 | Woo | G06F 21/121 |
| 2018/0234589 | A1* | 8/2018 | Xiao | G06F 21/60 |
| 2018/0239930 | A1* | 8/2018 | Lai | H04N 23/667 |
| 2019/0268341 | A1* | 8/2019 | Hugot | G06F 21/602 |
| 2019/0370013 | A1* | 12/2019 | Katchapalayam | G06F 9/44 |

* cited by examiner

*Primary Examiner* — Venkat Perungavoor
(74) *Attorney, Agent, or Firm* — Ferguson Braswell Fraser Kubasta PC

(57) ABSTRACT

An access client may transmit an access request to a server, and the access request may be an example of a decryption request or an encryption request. The access request may include access information and file information for a file to be accessed. The server may validate the access information and generate an access package that includes a set of access keys and executable code. The access keys may be transmitted to the access client. The access client may execute the executable code and decrypt or encrypt the file. The file may include one or more data packs that include file access policies, ownership information, and file access logs.

21 Claims, 23 Drawing Sheets

ENCRYPTED FILE CONTROL

CROSS REFERENCE

The present Application for Patent claims the benefit of U.S. Provisional Patent Application No. 63/081,763 by NIJASURE et al., entitled "ENCRYPTED FILE CONTROL," filed Sep. 22, 2020, assigned to the assignee hereof, and expressly incorporated by reference herein.

FIELD OF TECHNOLOGY

The present disclosure relates generally to data security, and more specifically to encrypted file control.

BACKGROUND

File encryption allows for sharing files between computers over insecure networks and may prevent third parties from accessing sensitive data. However, file encryption may only be as secure as the keys used to encrypt the files.

SUMMARY

The described techniques relate to improved methods, systems, devices, and apparatuses that support encrypted file control. Generally, the described techniques provide for sharing encrypted files without compromising the encryption keys used to encrypt the files. The payloads of the encrypted files are salted and encrypted with multiple salts and keys that are stored in multiple repositories. In response to an access request to encrypt or decrypt a file, a server generates an access package that includes information (e.g., data and/or code) for performing the access. For example, if the data pack includes source code, the source code may be injected with the salts and keys used to encrypt or decrypt payloads of encrypted files. A server sends an access response, with the access package, to the access device that sent the access request to the server. The access device may compile the source code from the access package to generate an executable that may encrypt or decrypt payloads of encrypted files. In some cases, the access device may transform the data of the payload based on data included in the access package. After being used, the executables and/or access packages may be removed from the access device to minimize the amount of time that the salts and keys are in the memory of the access device. Not storing the salts and keys on the access device reduces the impact and probability that an access device will be compromised.

DETAILED DESCRIPTION

Figure 1:
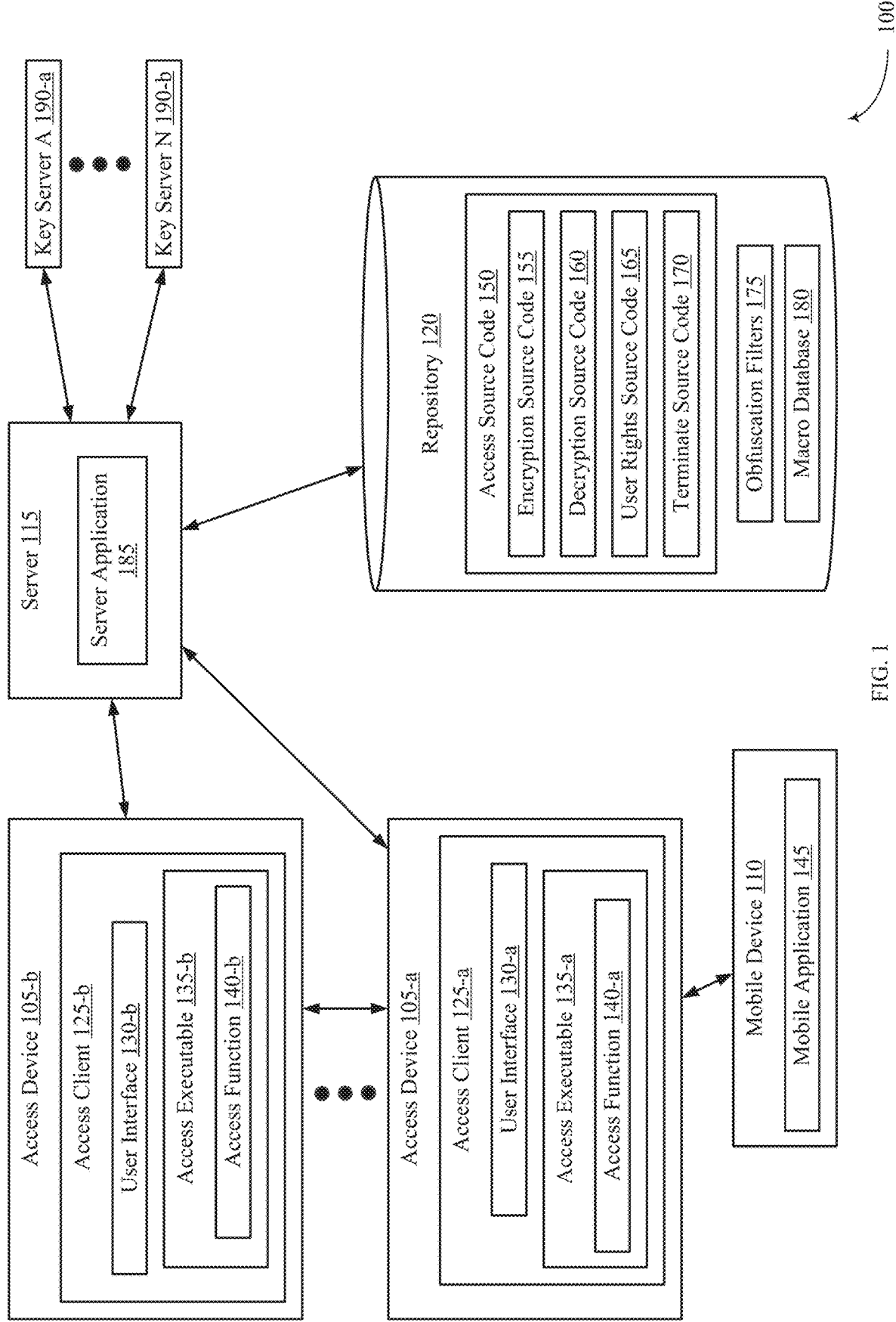
FIG. 1 illustrates an example of a system that supports encrypted file control in accordance with aspects of the present disclosure.

Encryption techniques are used in a variety of environments for securing data from unauthorized access. Various forms of cryptographic keys may be used for encryption of data, decryption of data, secure transmission of data, and the like. However, these techniques require that users and systems maintain control, containment, and visibility of keys and data in order to protect data. For example, organizations implement device management techniques and systems, identity management techniques and systems, storage management techniques and systems, cloud containment techniques and systems, data classification techniques and systems, among other techniques and systems, in order to protect data. Due to the complexities of these systems and techniques, as well as the proliferation of bad actors, data loss and unauthorized data access is widespread.

Implementations described herein support systems and techniques for self-protecting, self-aware, and self-intelligent data. The implementations described support an access client that is configured to interact with a server in order to protect data using the techniques described herein. The techniques support instant and dynamic data control. For example, if first user has transmitted an encrypted file to a second user, and the first user no longer wants the second user to have access to the file. The first user may access a platform to restrict the second user's access to the file in near real-time, even though the second user already has the file on their device. These techniques are supported at various levels of granularity including at the file level, groups of files or folders of files, team levels, organization levels, etc. Further, these techniques may be applicable to various elements or portions within a file. For example, a file may include one or more data objects (e.g., object linking and embedding objects (OLE), images), and these objects may be encrypted and decrypted (separate from the file itself) while applying various the file access policy techniques described herein. Additionally, the described techniques support file access restrictions or policies using various considerations, such as geographical locations, device types, and periods of times, among other restrictions. For example, a user may restrict access to a file or group of files by other users that are in a specific country. These restrictions may be implemented in near-real time even though the other users already have the file on their personal devices in the specific country.

To support these various techniques, a server may generate and transmit an access package to an access client that is executing on a user device in response to a request from the access client. The access package may include one or more cryptographic keys and executable code. The access client is configured to execute the executable code in order to encrypt or decrypt a payload (e.g., a file). The encrypted file may include one or more data packs that include file ownership information, file access policies, access logs, among other information. These data packs allow the data to be self-intelligent, as described in further detail herein. Further, the server with which the access client is configured to communicate may maintain various file access policies, such as authorized user access, device access, etc. The server may maintain a mapping of files and access policies (validation parameters). Thus, upon receipt of a request to encrypt/decrypt a file, the server checks that the user/device is authorized to perform an encryption/decryption, identifies the corresponding keys, generates the access package, and transmits the access package to the client. Thus, the self-intelligent data configuration, the access client, and the server function to maintain data security in a dynamic manner. These and other implementations are described in further detail with respect to the figures.

Aspects of the disclosure are initially described in the context of a computing environment supporting encryption file control. Aspects of the disclosure are further described with respect to an access package that supports encrypted file control, an example file control scenario, and process flow diagrams. Aspects of the disclosure are further illustrated by and described with reference to apparatus diagrams, system diagrams, and flowcharts that relate to encrypted file control.

FIG. 1 illustrates an example of a system 100 that supports encrypted file control in accordance with aspects of the present disclosure. The system 100 is configured to create and control access to encrypted files. The system 100 includes access devices 105, a mobile device 110, a server 115, and a repository 120.

The access devices 105 interact with encrypted files based on communications with the server 115. Each of the access devices 105, in conjunction with access clients 125 executing on the access devices 105, may act as an encryptor device to generate and encrypt files and as a decryptor device to decrypt and view encrypted files. As an example, the access device 105-b may be an encryptor device that generates an encrypted file (in conjunction with the server 115) and sends the encrypted file to the access device 105-a. The access device 105-a may be a decryptor device that decrypts (in conjunction with the server 115) and views the encrypted file in accordance with policies associated with the encrypted file.

Figure 8:
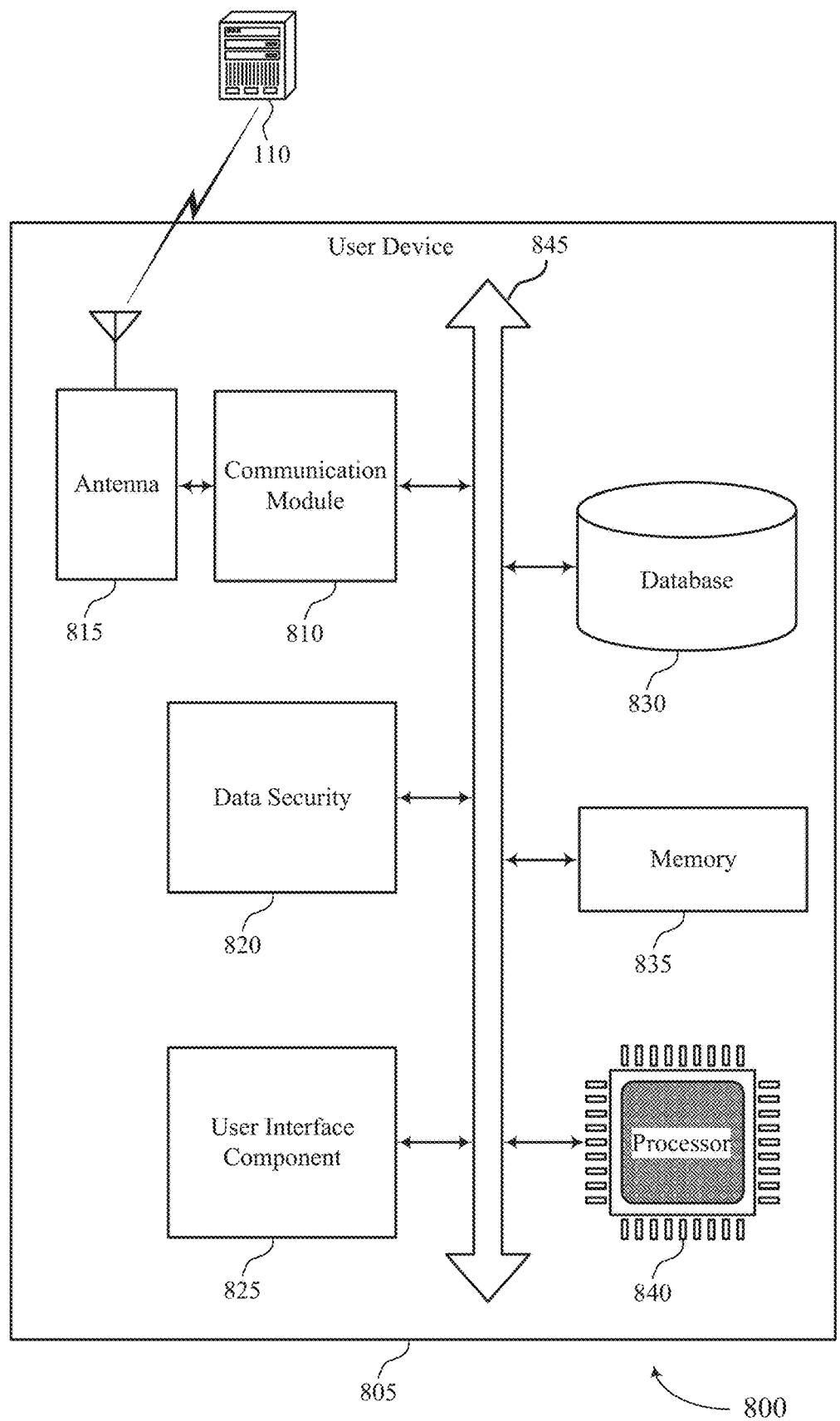
FIG. 8 shows a diagram of a system including a device that supports encrypted file control in accordance with aspects of the present disclosure.

The access devices 105 may be examples of computing systems in accordance with those described in FIG. 8 and, for example, may be smartphones, laptop computers, tablets, desktop computers, and the like. The access devices 105 may interact with the other access devices 105, the mobile device 110, and the server 115 using wired or wireless communication techniques.

The access device 105-a may encrypt files, receive encrypted files from other access devices, interact with the server 115 to generate and access encrypted files, present information decrypted from the encrypted files, and establish connections and update data with the mobile device 110. The access device 105-a includes an access client 125.

The access client 125 is set of programs operating on the access device 105-a that generates, accesses, and views encrypted files. The access client 125 may be a native application or web based application operating through a web browser on the access device 105-a. The access application may include a user interface 130-a and an access executable 135-a. The access clients 125 may also be application plug-ins for various file viewing applications, such as word processing applications, spreadsheet applications, and the like.

The user interface 130-a is part of the access client 125 that handles user interaction. The user interface 130-a includes user interface elements (buttons, text boxes, media player windows, etc.) that provide output to and receive input from a user. The access executable 135-a is an executable file created by the access device 105-a from an access package from the server 115 to manipulate encrypted files on the access device 105-a. As an example, the access executable 135-a may be a dynamic link library (DLL). The access executable 135-a includes an access function 140-a. The access function 140-a is a part of the access executable 135-a that performs a function. The access function 140-a may be an encryptor function that creates an encrypted file, a decryptor function that decrypts an encrypted file, a terminate function that removes an encrypted file, a decoy function, etc. A decoy function may provide output for an encrypted file that is similar the expected output from the encrypted file but does not include data from the payload of the encrypted file.

The access device 105-b includes the access client 125-b, which includes the user interface 130-b and the access executable 135-b. The access executable 135-b includes the access function 140-b. The hardware and components of the access device 105-b operate analogously to those of the access device 105-a.

The mobile device 110 interacts with the access device 105-a to establish network connections and transfer data. The mobile device 110 is a computing system in accordance with those described in FIG. 8 and, for example, may be a smartphone, desktop computer, laptop computer, tablet, or other type of personal device (e.g., a security card or security key). The mobile device 110 may establish a personal area wireless connection with the access device 105-a and transfer location information. The mobile device 110 includes the mobile application 145.

The mobile application 145 is a set of programs operating on the mobile device 110 that establish the connection to the access device 105-a, gather location data, and transfer location data. The mobile application 145 may gather the location data from a positioning system of the mobile device 110 (e.g., a global positioning system (GPS) module) that determines the location of the mobile device and may include the longitude, latitude, and altitude of the mobile device 110.

The server 115 interacts with the other components of the system 100 to control access to encrypted files. The server 115 may be an example of a computing system in accordance with those described in FIG. 10 and, for example, may be one of multiple servers in one or more cloud environments that host the server application 185.

The server application 185 is a set of programs that provides access responses to access requests from the access device 105-a through access device 105-b and may be managed by a services provider. The server 115 receives access requests from the access device 105-a through access device 105-b for encrypted files. The server application 185 authorizes the access requests using several types of information, including user credentials (user identifier, email address, access token, etc.), access device location information, mobile device location information, user privileges information, file access permissions, etc.

The server application 185 generates access responses for access requests based on the authorization of the access requests. The server application 185 generates access packages included within the access responses that are returned to the access device 105-*a* through access device 105-*b*. Access packages include source code from the repository 120 that has been injected with information, including keys from one or more of the key servers 190. The access packages may be compiled by the access devices 105 to form the respective access executables 135 and the respective access functions 140.

The key servers 190 generate and maintain the keys used to encrypt and decrypt files in the system 100. The key servers 190 communicate with the server 115. The key servers 190 may be hosted on different servers in different cloud zones and on different cloud environments to prevent the system 100 from having a single point of compromise and improve security. Different key servers may store different types of keys. For example, one key server may mange payload keys, another server may manage micro database keys, another key server may manage file keys, etc. Different key servers and sets of key servers may be set up for the different entities using the system 100. For example, a first entity may use a first set of key servers for the different types of keys and a second entity may have a second set of key servers, which may be different from the first set of key servers.

Figure 10:
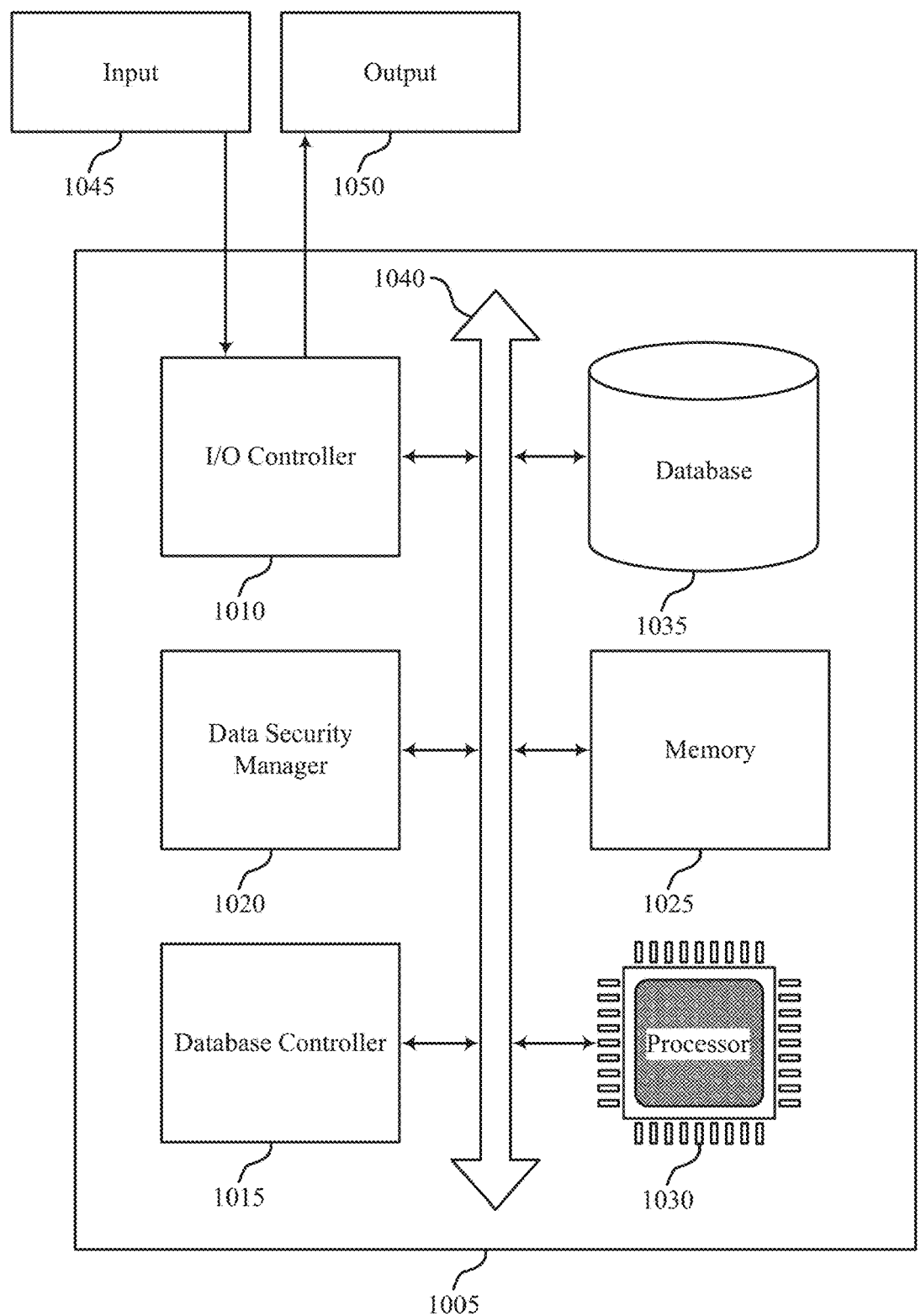
FIG. 10 shows a diagram of a system including a device that supports encrypted file control in accordance with aspects of the present disclosure.

The repository 120 is a computing system that may include multiple computing devices in accordance with those described in FIG. 10. The repository 120 may be hosted by a cloud services provider hosting the server application 185. The cloud services provider may provide hosting, virtualization, and data storage services as well as other cloud services. The services provider managing the server application 185 may operate and control the data, programs, and applications that store and retrieve data from the repository 120. The data in the repository 120 may include source code, filters, databases, etc. As an example, the repository 120 includes access source code 150, obfuscation filters 175, and a macro database 180.

The access source code 150 is the source code that is used to generate the access executables 135 after being injected with additional information (e.g., keys from one or more key servers 190). The access source code 150 includes encryption source code 155, decryption source code 160, user rights source code 165, and terminate source code 170. The encryption source code 155 includes instructions for encrypting payloads to generate encrypted files. The decryption source code 160 includes instructions for decrypting encrypted files to recover the payloads from the encrypted files. The user rights source code 165 includes instructions for processing encrypted files based on user access rights (e.g., full access, collaborative access, and read only access). The terminate source code 170 includes instructions for removing an encrypted file from an access device.

User access rights to a file may include various levels such as full access, collaborative access, and read only access. With full access, the user may recover the original file, which may be edited with external applications. For example, a spreadsheet may be recovered and edited with a native spreadsheet application. With collaborative access, the user may view and update information within an encrypted file but not recover the original file. For example, the user may be able to view and edit information from the payload of the encrypted file within the access client 125 but may not be able to save or print the information from the payload of the encrypted file. With read only access, the user may view information from an encrypted file without being able to edit the information. For example, the user may view the information using the access client 125 but may not edit, print, or save information from the encrypted file being viewed. The user access rights, which also may be referred to as access policies, may be enforced by the access client 125 and/or the access executable 135. In some cases, the user access rights may prevent the payload from being shared within a video conferencing application.

The obfuscation filters 175 implement data loss prevention (DLP). The obfuscation filters 175 identify types and structures of data to obfuscate. As an example, an obfuscation filter may use regular expressions to identify social security numbers with search string "\d{3}-\d{2}-\d{4}" and replace matches with the replacement string "XXX-XX-XXXX" to remove social security numbers from a document. The obfuscation filters 175 may be applied prior to encrypting a payload so that the payload of an encrypted file does not include personally identifying information. Additionally, the obfuscation filters 175 may be applied after decryption of an encrypted file to prevent viewing or distributing personally identifying information from an encrypted file. For example, the obfuscation filters 175 may be enforced as access policies or user rights.

The macro database 180 stores information about the files controlled by the system 100. The macro database 180 may include a superset of the information in the micro databases (e.g., also referred to as data packs) stored in each encrypted file of the system 100. The macro database 180 stores information about each access of each encrypted file. For example, the macro database 180 for an encrypted file may include a table of information with columns for the date of access to the encrypted file, the type of access (create, read, write, update, etc., information about a user (e.g., a user identifier), information about the access device (hardware identifiers, software identifiers, network connection identifiers, machine address code (MAC) address identifiers, etc.). The rows of the table may distinguish between different access events. The macro database 180 documents a chain of custody that identifies the users and machines that access the encrypted files of the system 100.

The macro database 180 may use a hash chain to store the access event information. For example, for each access event added to the macro database 180 for an encrypted file, the information of the access event combined with a prior hash value to form a hash payload. A cryptographic hashing algorithm is applied to the hash payload to generate a new hash value that is stored with the access event information. The new hash value may be used as the "prior hash value" for a subsequent access event to form an immutable chain of hash values. If information in the hash chain is modified, then subsequent hash values will be incorrect.

Each of the components of the system 100 work in conjunction to support dynamic, self-intelligent, and self-protecting data security. For example, a user may access the access client 125-*a* to secure a file and grant access to the file for various users. Using the access client 125-*a* the user selects the file that is to be secured. The file may be an example of a video file, audio file, word processor file, text file, multimedia file, PDF, or the like. After selecting the file for securing, the user may be prompted, by the access client 125-*a*, to select user access parameters that correspond to file access policies. These user access parameters (or user access policies) may include users that are authorized to view the file, location or geofencing restrictions (e.g., office or other administrative authorized locations), time periods or embargos, device restrictions, among other types of policies and restrictions.

For selecting users, the access client 125-*a* may access a local or remote listing of contacts or users and prompt the user to search for and/or select the users that are to have access the file and type of access (e.g., read only, collaborate, full access) for each user.

After selection of access policies, the user may select a user interface (UI) component to encrypt the file. As described in further detail herein, the access client 125-*a* may receive an access package from the server 115 in response to requesting to encrypt the file. The access package may include the access executable 135-*a*, and the access client 125-*a* may execute the instructions of the executable 135-*a* to encrypt the file using keys received from server 115 in the access package. Encryption of the file results in a new encrypted file with a new file extension (e.g., different from the original file), and the new encrypted file is intelligent (rights management aware) based on the file access policies that are embedded in the encrypted file itself. In some implementations, the new encrypted file replaces the original file. In such cases, the original file is automatically deleted upon successful creation of the encrypted file. This feature may depend on an organization's specific policies or may be activated upon file encryption.

The encrypted file may be passed to other various users using a variety of techniques, such as email, FTP, database access, remote access, etc. For example, the access device 105-*b* has local or remote access to the encrypted file. If the user tries to open the file, then the access client 125-*a* is configured to transmit a decryption request to the server 115. The request may include various information that is to be validated at the server 115. If the server 115 validates the request, then the server 115 transmits a response with an access package that includes the access executable 135-*b*. The access client 125-*b* executes the instructions of the access executable 135-*b* to decrypt the file and its components (e.g., data packs, described in further detail herein). The access client 125-*b* enforces user access rights or access policies that are included in the data packs.

The data packs that are included with the encrypted files include ownership information (e.g., user, device, organization), file access policies (e.g., types of user access rights), and access logs. This information travels with the encrypted file and may be updated via a decryption request. As the file access policies are included with the file, the contents of the file (e.g., the payload, such as PDF) are accessible when the file access policies are enforced.

Additionally, as described herein, the server 115, via the server application 185 and repository 120, maintains file policies and access rights. Generally (some exceptions exist, as described herein), an encrypted file is not decryptable by an access client 125 without communicating with a server. Thus, users (e.g., administrative users or file owners) may update file access policies associated with various files using an access client 125 (e.g., a dashboard supported by the access client 125). Upon receiving a decryption request for a file, the server 115 may determine that the access policies in the file are stale (e.g., not current) and transmit the updated access policies with the access package to the access client 125. As such, the file access may be dynamically updated without having to first decrypt the files to include updated access policies. Additionally, because the server communication generally occurs with file access requests (e.g., decryption or encryption request), the server 115 may maintain a log of such requests. The log may be used to support a dashboard used by administrative users to view access locations, access denials, users that have requested access, and the like. Additionally, the dashboard may be used to change access policies for various users, various files, etc. in near-real time. As such, the techniques described herein may allow an organization to have a full and near-real time view of their file security mechanisms and results.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
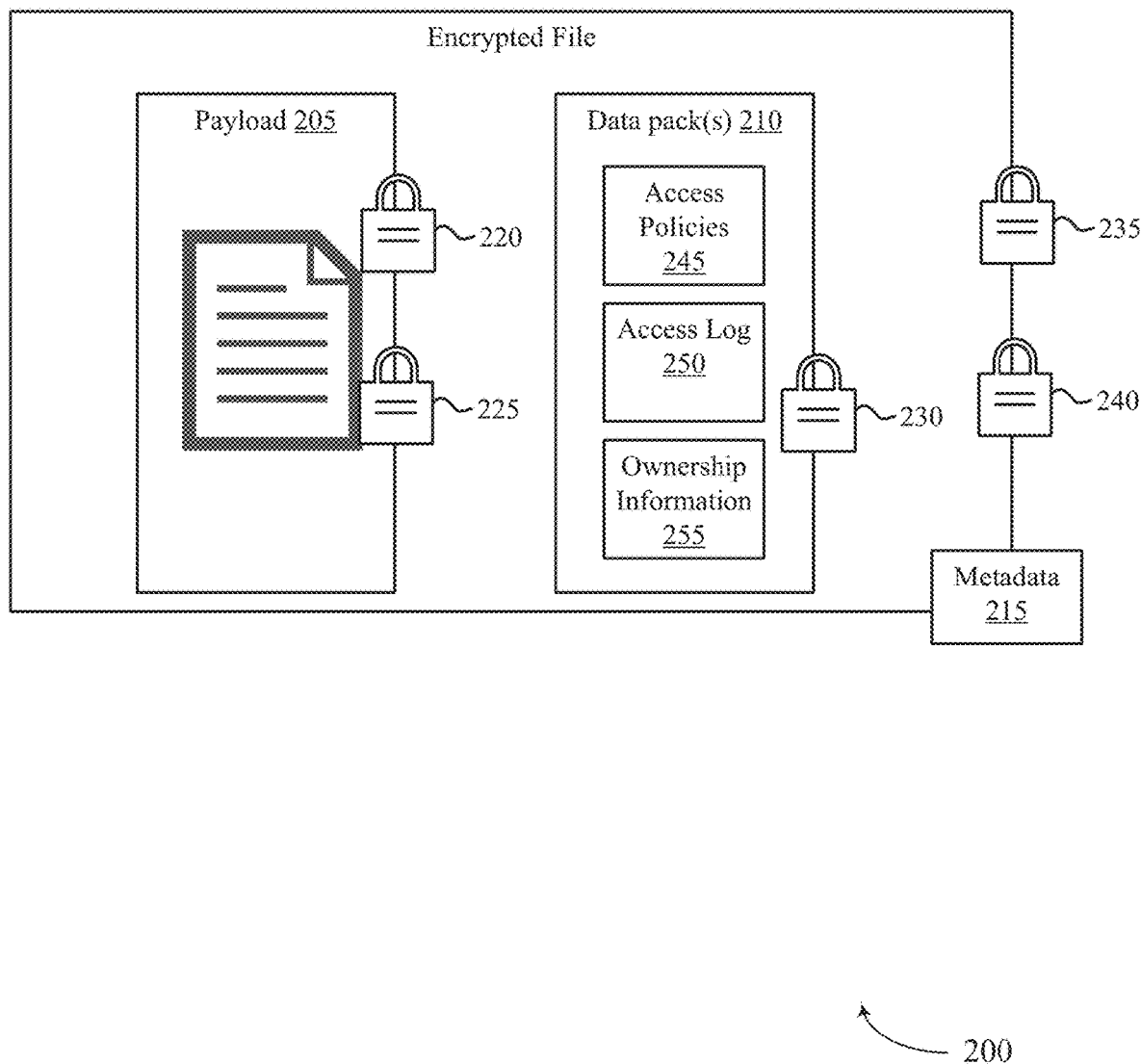
FIG. 2 illustrates an example of an encrypted file that supports encrypted file control in accordance with aspects of the present disclosure.

FIG. 2 illustrates an example of an encrypted file 200 that supports encrypted file control in accordance with aspects of the present disclosure. The encrypted file 200 uses multiple salts and keys (which are not stored in the encrypted file 200) to control access to the payload 205 and protect the payload 205 from unauthorized access. The encrypted file 200 includes the payload 205, the data packs 210, and the metadata 215.

The payload 205 is an electronic file that forms the basis of the encrypted file 200. The payload 205 may include any type of electronic file, including text documents, spreadsheets, slide presentations, source code files, image files, archive files, video files, etc. The encrypted file 200 may include a single file within the payload 205.

The payload 205 may be salted with the payload salt 220 and encrypted with the payload key 225 prior to being inserted into the encrypted file 200. In some implementations, the payload key 225 may be an advanced encryption standard (AES) 256 key that is 256 bits long. In some implementations, the payload salt 220 is a randomly generated eight byte value. In some implementations, the payload salt 220 is applied to the payload 205 by appending the payload salt 220 to the payload 205.

The data packs 210 (which may also be referred to as a micro database, owner database, or a combination thereof) may include a subset of information of the macro database (e.g., macro database 180 of FIG. 1) that pertains to recent access to the encrypted file 200, file access policies associated with the encrypted file 200, and owner information associated with the encrypted file. The data packs 210 may include access log information (e.g., in access log 250) that that identifies prior last user(s) to access the encrypted file 200 and the prior access device(s) to access the encrypted file 200. For example, the data pack may include the access log 250 that includes fingerprints associated with users and devices that previously accessed the encrypted file 200. User fingerprint information may include an email address, an access token, a hash value, etc. Access device fingerprint information may include a hardware and/or software identifier. In some examples, the finger information for the access log 250 may include network information, geographical location information, access client information, etc. In some cases, the access log 250 includes hardware information that uniquely identifies a hardware component executing the access client. As an example, the hardware information may be a user thumbprint that is a universally unique identifier (UUID) from the computing system of the user. As another example, the user thumbprint may be a motherboard serial number. The access information of the access log 250 may include an access timestamp. The access timestamp may identify the date and time of the last successful access to the encrypted file 200.

Additionally, the data packs 210 may include indications of access rights (e.g., file access policies 245) for the encrypted file 200 and entity or ownership information (also referred to as an owner database) for the encrypted file 200. The file access policies 245 may indicate full access, collaborative access, read only access and may be specified on a global basis, a per group basis, a per user basis, etc. The file access policies may also include digital rights management information, which may be a subset of file access policies that includes data that identifies the privileges and access rights of users for the encrypted file 200. As an example, the digital rights management information may include values for the following fields: PrintAllowed, SaveAllowed, LocalCopyAllowed, ForwardAllowed, Collaborate, ReadOnly, and FullAccess. The digital rights management information may be configured on a global basis, per group basis, per user basis, etc. The access rights may also include display constraints that restrict or allow access to the file using various programs, such as a restricting or allowance of sharing the payload in a video conference program.

The values for the PrintAllowed, SaveAllowed, LocalCopyAllowed, ForwardAllowed may be binary values. The value for the PrintAllowed field identifies if information from the payload 205 of the encrypted file 200 may be printed by a user. The value for the SaveAllowed field identifies if information from the payload 205 of the encrypted file 200 may be saved by a user to an access device. The value for the LocalCopyAllowed field identifies if a local copy of information from the payload 205 of the encrypted file 200 may be stored on an access device. The value for the ForwardAllowed field identifies if information from the payload 205 of the encrypted file 200 may be forwarded to another device (e.g., as part of an email).

The values for the Collaborate, ReadOnly, and FullAccess may be binary values that may be set independently. The value for the Collaborate field identifies if a user may have collaborative access to the payload 205 of the encrypted file 200. The value for the ReadOnly field identifies if a user may have read only access to the payload 205 of the encrypted file 200. The value for the FullAccess field identifies if a user may have full access to the payload 205 of the encrypted file 200.

The access policies 245 may also include data loss prevention information that includes information and instructions that may identify and remove or obfuscate sensitive information from the payload 205 of the encrypted file 200. The data loss prevention information may be examples of display constraints, as described herein. The sensitive information they include personally identifying information. The sensitive information may be removed or obfuscated before the payload 205 is viewed with or saved to an access device acting as a decryptor device. As an example, the data loss prevention information may include values for the following fields PackageID, Rules, Rule ID.

A value for a PackageID identifies a package of source code that is to be included in an access package to remove or obfuscate sensitive information from the payload 205. Values for the Rules field identify groups of rules that are to be included in an access package to remove or obfuscate sensitive information from the payload 205. A value for a RuleID identifies a particular rule that is to be included in an access package to remove or obfuscate sensitive information from the payload 205. Each rule for data loss prevention they include a regular expression string with a substitution string to replace data in the payload 205 that matches the regular expression (from the regular expression stream) according to the substitution string.

The file access policies 245 may also include termination information. Termination information may include a termination flag that identifies if the payload 205 of the encrypted file 200 has been terminated. The payload 205 may have been terminated by replacing the original payload (after encryption) with null or random data that is the same size as the original payload to prevent access to data in the original payload. The termination flag may be set to true when a unauthorized user or device tries to access the encrypted file 200.

The file access policies 245 may also force geographical location restrictions. For example, a file access policy may indicate that the file is accessible only at an office location, a geographical location (e.g., within a state or country), or the like. Thus, when the policy is being enforced, the access client may use network information, GPS information, or other information that may be used to identify a geographical location, in order to determine that access is authorized. If such information is unavailable, access to the payload 205 may be restricted. Thus, the file access policies 245 may include various forms, including bits that indicate types of access rights, indications of rules or instructions enforcing data loss preventions, indications of geographical restrictions, and the like. In some cases, the file access policies 245 may restrict a user from using a virtual private network (VPN) to access the files. Thus, if a VPN is detected, then an access request may be rejected or the user may be restricted from viewing the file.

The ownership information 255 may include a value for an Author ID field uniquely identifies the user that created the encrypted file 200. The value for the Author ID may be an email address, an employee identifier, a username, etc. The ownership information 255 may include an entity signature, such as a digital signature. A user of the system may be one of multiple employees of the entity. Each encrypted file generated by users for the entity may include the same entity signature, which identifies the entity as the source of the encrypted file, or multiple entity signatures, which may identify the entity source of the encrypted file and the user that generated the encrypted file.

The ownership information 255 may also include entity database information that includes an indication of one or more application programming interface (API) endpoints (e.g., uniform resource locators (URLs) that the access client is used to verify that a user has access to the encrypted file. For example, the one or more API endpoints indicated may be a Verify API and a Transfer API. The Verify API may be accessed to verify that a user (having the same entity as the encrypted file 200) may access the encrypted file 200. The Transfer API may be accessed to verify that a user (having different entity as the encrypted file 200) may access the encrypted file 200. As the API endpoints may be access before decryption of the encrypted file 200, the API endpoints may be located outside any encryption wrapper (e.g., may not be encrypted by one of the keys). For example, indications of the API endpoints may be included in metadata 215.

The metadata 215 is a store of information about the encrypted file 200. As an example, the metadata 215 may identify the type of file in the payload 205, the name of the file in the payload 205, the length of the file in the payload 205, the encryption algorithms for the payload 205 (including the salting algorithm), the encryption algorithms for the data packs 210, the encryption algorithms for the encrypted file 200, etc. As described herein, the metadata 215 may also include indications of the API endpoints. Various aspects of the metadata 215 may or may not be encrypted as part of the encrypted file 200. In some cases, aspects of the metadata 215 may be included in an access request (encryption or decryption request) to the server.

The data packs 210 may be encrypted with one or more data pack keys 230 prior to being inserted into the encrypted file 200. In some implementations, the one or more data pack keys 230 may be an advanced encryption standard (AES) 128 keys. The one or more data pack keys 230 may be shorter than the payload key 225 to reduce the time needed to access the data in the data packs 210.

The encrypted file 200 may be salted with the file salt 235 and encrypted with the file key 240. In some implementations, the file key 240 may be an advanced encryption standard (AES) 256 key. In some implementations, the file salt 235 is a randomly generated eight byte value. The file salt 235 may be applied to the contents of the encrypted file 200 (e.g., the payload 205 after being salted with the payload salt 220 and encrypted with the payload key 225, the data packs 210 after being encrypted with the data pack keys 230) by appending the file salt 235 to the encrypted file 200.

In some implementations, a salt (e.g., the file salt 235) is created by generating a first random 8 digit number between 10000000 to 99999999 stored in Y. A second random number between 1 and 8 is then generated and stored in X. The Xth digit in Y is then replaced with the value of X. The steps of generating the second random number and replacing a value in Y are repeated four times. The value after the last replacement is the salt. Different algorithms may be used to generate the salts used by the system.

Various information included in the data packs 210, in conjunction with the server communications, supports the dynamic, self-intelligent, and self-protecting data security schemes described herein. When an access client receives an access package (e.g., executables and access keys) from the server, the access client executes the executable code of the access package to decrypt the contents of the encrypted file using various keys. The access client is configured to enforce the access policies 245 that are included in the encrypted file. Further, upon decryption, the executable code of the access package may cause the access log 250 to be updated with the information about the access client (e.g., client identifier, version, fingerprint), device executing the access client (e.g., device identifier, motherboard identifier, hardware identifier), user information, and other information as described herein. As such, if the encrypted file 200 is passed to another user or device, and the user attempts to open the encrypted file 200, the contents of the access log 250 may be used to identify the chain of custody of the encrypted file 200 to see who and/or which device compromised the encrypted file 200.

In some cases, before the file is decrypted, the access policies 245 associated with the file may be updated. In such cases, upon a decryption request being sent to the server (e.g., server 115), the server may respond with updated access policies in the access package such that the updated access policies are enforced upon decryption. However, because the access policies are included with the file, various other features, such as offline access, are supported.

Aspects of FIG. 2 are described with respect to the payload 205 being a file. It should be understood that the techniques described herein may be applicable to portions of a file or objects within a file. For example, a file may include multiple elements (e.g., OLE elements), images, charts, etc. that are embedded within a file. In such cases, the payload 205 may be an example of one particular element within a file or a portion of the file (e.g., particular pages). Thus, the element or page (e.g., payload 205) may be encrypted and the access policies 245 may be enforced for the element or page. Similarly, the access log 250 and ownership information 255 may be based on the element or page within the file that is secured.

Figure 3:
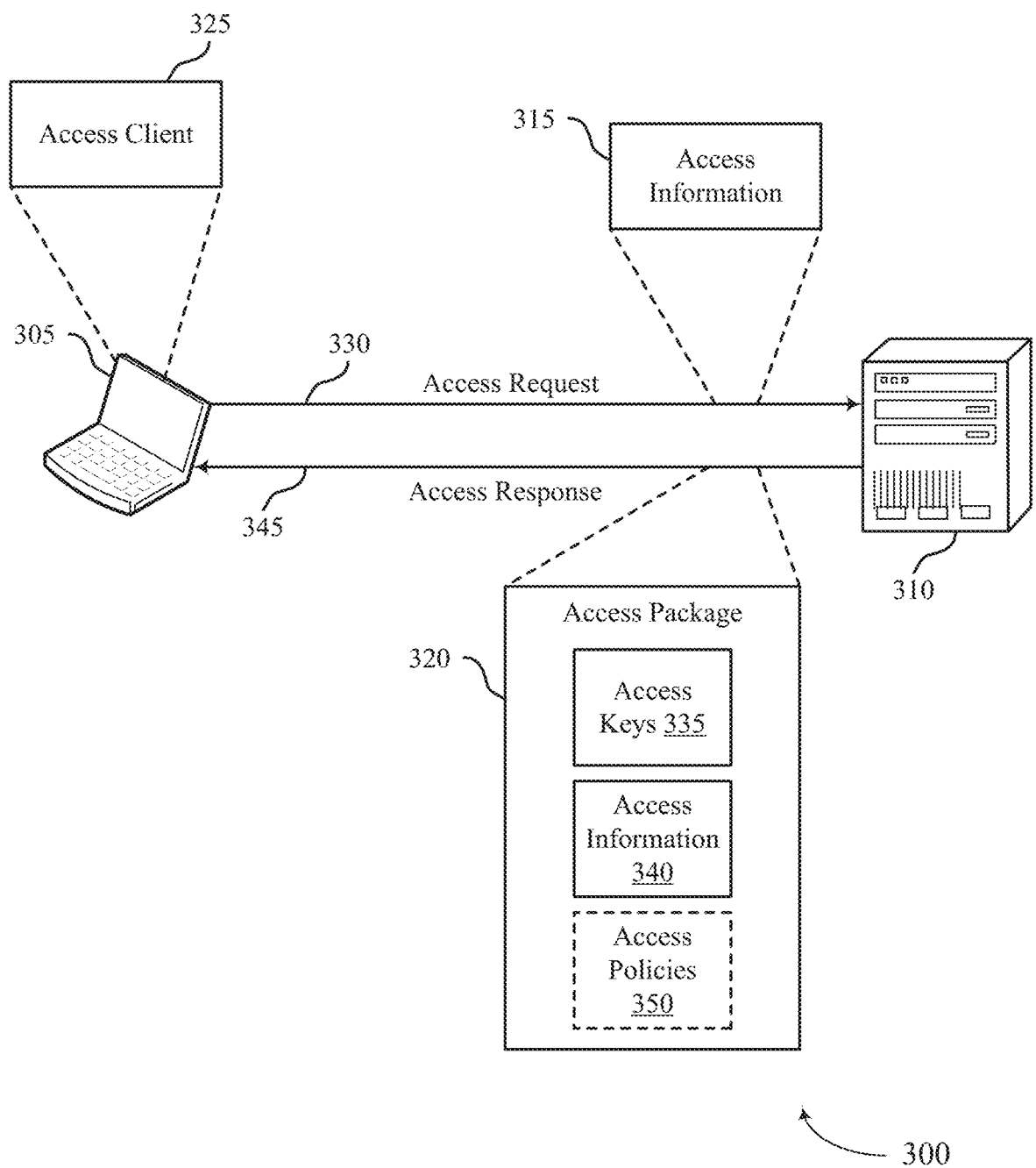
FIG. 3 illustrates an example of a computing architecture that supports encrypted file control in accordance with aspects of the present disclosure.

FIG. 3 illustrates an example of a computing architecture 300 that supports encrypted file control in accordance with aspects of the present disclosure. The computing architecture 300 includes a user device 305 and a server 310. The user device 305 may be an example of an access device 105 as described with respect to FIG. 1. The server 310 may be an example of a server 115 as described with respect to FIG. 1. The user device 305 may be configured to execute an access client 325 to support the file control techniques described herein.

A user of the user device 305 may access the access client 325 to encrypt and/or decrypt files or portions of files according to the techniques described herein. In some cases, the user is required to login to the access client daily, periodically, etc. Logging in to the access cline 325 may trigger a communication with the server 310 including establishing a secure connection. Additionally, a token may be generated at login, and the token may be used for secure communications with the server 325. In some examples, the user may register a geographic location, network identifier, etc. at login, and such information is used for token generation, secure communications with the server, file access policy enforcement (e.g., data geo-fencing), etc.

In an example use of the access client 325, user may use the access client to secure a file or portion of a file before it is transmitted to a set of users. The user may select the file and then select file access policies for the file via the access client 325. After selection of the file and the file access policies, the access client 325 may send an access request 330 to the server 310. In the case of an encryption request, the server 310 may be identified based on a URL (e.g., an API endpoint) configured at the access client 325. The access request 330 may include access information 315, as well as file information associated with the file (file size, type, file metadata). The access information 315 may be customized based on the access client 325. Depending on the implementation (e.g., organization configurations, personal configurations) of the access client 325, the access information may include various information, such as internet protocol (IP) address, network information, motherboard identifier, universally unique (UU) identifier, user identifiers, client identifiers (e.g., client license identifier), client version, geo-location information, browser information (e.g., in case of a browser based client), application information (e.g., in case of a client plug-in). The access information 315 may also include an access token.

The access information may include information about the user, the computing system of the user, the location of the computing system, and the type of access being requested. The information about the user may include a username, user access tokens, a digital signature of the user, a public key of user, etc. The information about the computing system of the user may include hardware and software identifiers of the hardware and software components of the computing system. The information about the location of the computer system may include an IP address for the computer system, which may be mapped to a geographic location. The access information may be part of a header of the access request and may be formatted in accordance with the JavaScript object notation (JSON) standard.

The server 310 may validate the access information 315. Validations may include validating locations, validating networks, validating the device, validating the token (e.g., token is active), and other information. In some cases, an organization may be associated with organization policies that indication certain information is to be present in order to use the encrypt function. For example, a global policy may indicate that employees or users may only be able to encrypt a file when present at the office. As such, various validations are used to ensure organizational policies are satisfied. The validations are customizable for various considerations and scenarios.

The access information 315, the access request 330, or another communication from the access client 325 may also include indications of file access policies for the file to be encrypted. Thus, the selected policies, including read, write, collaborate, geo-restriction policies, authorized users, and other policies may be communicated to the server 310. The server 310 may maintain a record of the file information and access policies (e.g., in the macro database 180 of FIG. 1) in a secure repository.

If the access request 330 is validated, the access information may be stored as described herein, and the server 310 may generate an access package 320. In order to generate the access package 320, the server 310 may call (e.g., transmit a request to) a secure key store to generate encryption keys using a key service. The secure key store may be an example of a third party key management service. The secure key store may return a random string that is used to generate the keys. The server 310 may be configured to split the string into one or more access keys 335, and as such, the secure key store may not be able to identify the access keys 335. In some examples, the request to the key store may include file identification information that may be used in subsequent decryption request to receive the key string. Each encryption request may result in a different set of keys.

The server 310 may also generate access information 340 for the access package 320. The access information may include code (e.g., executable code) from various types of encryption or decryption libraries. As such, the encryption/decryption schemes and keys may be customizable depending on the desires of the organization implementing the techniques described herein. The access information 340 may include instructions for encrypting the file including the payload and data packs. In some cases, the access package 320 may include the indication of the file access policies and/or ownership information such that the policies and ownership information may be encrypted with the file. The access information 340 may be retrieved from a instruction repository (e.g., repository 120 of FIG. 1). The instruction repository may be configured for each tenant or organization that implements the system described herein, and as such, may use customizable or selectable encryption/decryption techniques, key formats, and the like.

In some cases, as described herein, the access information 340 are compliable by the device 305 to generate machine executable code that is used to perform the operations (e.g., encrypt, decrypt, enforce policies). In some cases, the access information 340 may include values or data payloads which is used to transform the data of the payload/file into another form, or is used to apply operations to change values within the data, or both. In some examples, the data transformation instructions may be indicated in the access package 320 or may be configured at the access client 325. As such, when the access information 320 includes the values or data payloads, the access information 320 (and the access package 320) may not include compliable or executable code.

The access package 320 is transmitted to the device 305 (e.g., the access client 325) in an access response 345. The access client 325 is configured to use the access information 340 in order to generate the encrypted file (e.g., using access keys 335). Using the access information may include executing the code included in the access information 340 that causes instantiation and encryption of the data packs, encryption of the payload (e.g., file to be encrypted), and encryption of the data packs and the file together. As such, depending on the configuration, there may be multiple layers of encryption in the encrypted file. The encrypted file may then be transmitted to various other users and devices using file transfer or communication techniques.

If the access request 330 is a decryption request, then similar techniques may be used. Similar access information 315 may be communicated to the server 310. The server 310 may perform various validations. The validations for decryption may be different than the encryption validations. For example, the server 310 may determine whether the user and/or device requesting decryption are authorized to access the file based on the information stored in association with the file identifier. In some cases, the validation includes determining that the location of the requesting user device 305 satisfies a location policy (geo-location, network location).

If the access request 330 is validated, then the server 310 may generate the access package 320. Generation of the access package may include transmitting a request to the key storage service for the associated key string. For example, the request to the key storage service may include an indication of the file identifier for the file to be decrypted. The server 310 may receive the key string and generate the access key 335 and the access information 340. In this case, the executable code may include decryption instruction for decrypting the entire file, the data packs, and the payload of the encrypted file.

In some cases, the access information 340 may cause the file and then the data packs to be encrypted. The file access policies of the data packs may then be enforced before the payload is decrypted. For example, if a policy is a geo-location policy and the policy is not satisfied based on information identified by the access client 325, then the execution of the access information 340 may be terminated until the policy is satisfied. Thus, the payload is not accessed even though portions of the file were decrypted.

To execute the access information 340, the access client 325 may instantiate an object associated with the code in memory and use the access keys 335 to encrypt or decrypt the file. After the file is successfully encrypted or decrypted, the code is destroyed (e.g., removed from memory). Thus, the object is sustained in the memory of the device 305 at run-time and removed after execution. Thus, the access client 325 is configured only to execute the code and is not configured (without the code) to encrypt or decrypt the files.

In some examples, the server 310 determines that the access request 330 is invalid based on the access information 315. For example, the server 310 may determine that the request came from an unauthorized location, network, device, client, user, etc. In such cases, the server 310 may perform various actions. One action may include transmitting an alert to an administrative user (e.g., via an email, alert, or the like). Another action may include generating the access package 320 with access information 340 that is configured to overwrite the contents of the payload. Additionally or alternatively, the access information 340 may trigger a termination flag in the file access policies. As such, after in unauthorized request, the user may not access the file, and the contents of the file may be overwritten.

In some cases, the server 310 may determine that the access request 330 is valid, but the server 310 but may also determine that the access policies 350 associated with the file are stale or out of date. To make such a determination, the server 310 may compare information (e.g., file information, hash values, versions) included in the access information 315 to information (e.g., file information, hash values, versions) maintained by the server 310. If the policies are stale or out of date, the access package 320 may include updated or current access policies 350 that are enforced by the access client 325.

As described herein, the access package may be an encryptor package, decryptor package, decoy package, or terminate package. The encryptor package may include source code with functions to encrypt data but does not include source code with functions to decrypt data. The decryptor package may include source code with functions to decrypt data but not for encrypting data. The terminate package may include source code with functions to hide or remove encrypted files. The decoy package may include source code with functions to display data that looks similar to data from an encrypted file, but which does not include data from the encrypted file. The terminate package and the decoy package may not include source code, keys, or salts used to encrypt or decrypt data.

The terminate package may hide data by displaying a message to the user indicating that data from an encrypted file may not be decrypted. The terminate package may remove data by overwriting data within an encrypted file with random data in response to and access authorization indicating that the computing system that sent the access request is located in a prohibited area of the geofence. Prohibited areas of the geofence may include certain countries.

In some cases, the access client 325 is configured with access to folder structures at the user device 305, at a file storage web service, at a remote server, or the like. The access client 325 may also be configured to encrypt any file that is saved to a designated folder or location. As such, when a file is saved to a folder, the access client 325 may trigger the access request 330 (encryption request) transmissions to the server 310. Thus, using these techniques, folder level security schemes may be enforced.

Figure 4:
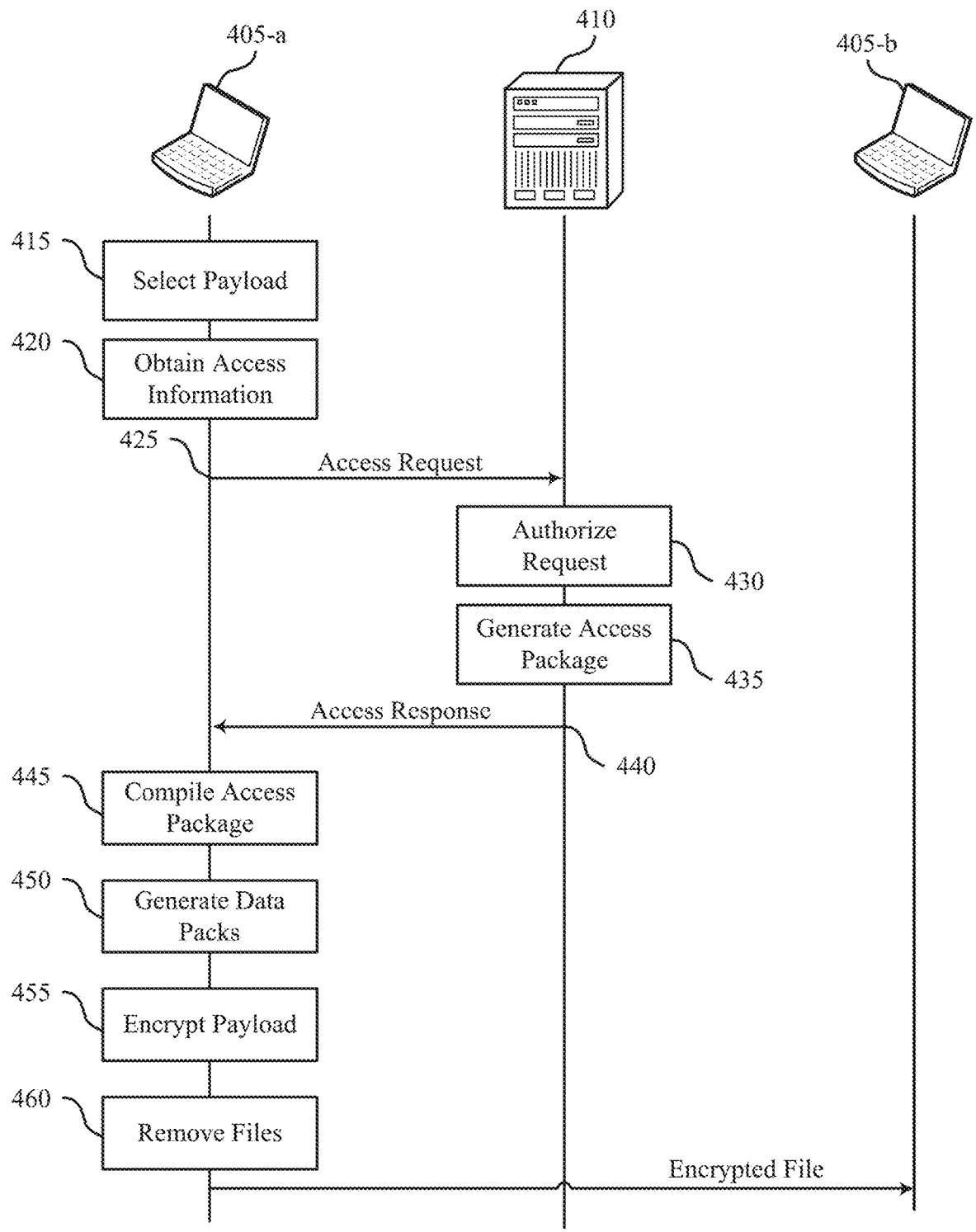
FIG. 4 illustrates an example of a process flow that supports encrypted file control in accordance with aspects of the present disclosure.

FIG. 4 illustrates an example of a process flow 400 that supports encrypted file control in accordance with aspects of the present disclosure. Specifically, process flow 400 illustrates operations for encrypting files according to the techniques described herein. The process flow 400 includes access devices 405 and a server 410, which may be examples of the corresponding devices described with respect to FIGS. 1 through 3.

At 415, a payload is selected. The payload may be selected by a user with a user interface of an access client executing on the access device 405-*a*. At 420, the access client of the access device 405-*a* may obtain access information. The access information may include information about the user and the access device 405-*a*. As an example, the information may include hardware component identifier from the access device 405-*a* and an internet protocol address of the access device 405-*a*.

At 425, the access device 405-*a* transmits an access request to the server 410. The request is an encryption request to encrypt the payload. The access request includes the access information obtain using the access device 405-*a*. The server may be identified based on a configuration at the access client. For example, the access request may be transmitted to the server via an API endpoint that is configured at the access client.

At 430, the server 410 may authorize or validate the request. Authorizing the request includes checking the location of the access device 405-*a* and verifying that the user is authorized to use the system and perform the requested action. The location may be checked by identify the geographical location of the access device 405-*a* from the IP address of the access device 405-*a* and comparing the geographical location to a set of geofences, which may identify a set of countries in which the system may not be used. In this example, the user is verified from data in the access information. For example, a user access token may be provided that indicates the user is authorized to use the system and perform the requested action.

Identification of the computing system that sent the request may be satisfied by receiving identifiers of hardware or software components, which may include MAC addresses, international mobile equipment identity (IMEI), serial numbers and model numbers for the computing system components (motherboard, processor, memory, graphics card, etc.), software version numbers for the operating system and basic input/output system (BIOS), etc.). The identifiers for the computing system hardware and software components may be verified by comparing the received identifiers to computing system component identifiers that have been previously received and linked to the user making the access request.

The location of the computing system may be checked by mapping the IP address of the computing system to a geographical location. The mapped geographical location may be compared to a geofence that identifies permissible geographical locations for the type of access specified in the access request. In some implementations, the geofence may identify certain countries in which no access is provided. The location of the computing system may also be identified based on wireless local area network (WLAN) or wireless wide area network (WWAN) positioning (e.g. cellular based positioning).

The access privileges may depend on the type of access being requested. For an encryption request, system access privilege policies, which may apply to each user of the system, may be checked to ensure that the user requesting the encryption is permitted to do so based on the system access privilege policies. For a decryption request, system policies that apply to each user of the system, group policies that apply to groups of users of the system, user policies that apply to individual users, and file policies that apply to individual files are checked to verify that a particular user may access a particular file with a particular level of privilege. The privilege levels may include full access, collaborative access, and read only. Each of the different types of policies may specify the level of access to individual or groups of files.

Authorizing the access request may include comparing access device location information from the access information to an access device location rule to determine the access authorization. The access device location information may include the interne protocol (IP) address of the computing system that sent the access request and the geographic location to which the IP address is mapped. The device location rule may define a geofence within which access may be authorized. The geofence identifies the geographical locations where access may be authorized or may be restricted. As an example, when the geographic location for the computing system is compared to a geofence that defines the area of a geographic location of a building and the computing system is determined to be within a geofence, access may be indicated as authorized within the access authorization. When the comparison indicates that the computing system is not within the geofence, the access authorization may indicate that access is not authorized. In another example of authoring the access request, the server may determine whether the access device is utilizing a VPN in order to determine that the IP mapping retrieved does not mask the user's location. Thus, in some cases, the user and access request may be rejected when a VPN is being used.

Authorizing the access request may also include comparing mobile device location information from the access information to a mobile device location rule to determine the access authorization. The mobile device location information may include satellite positioning information. Additionally or alternatively, the mobile device location information may identify a type of connection between the mobile device and the access device. The mobile device may be connected to the access device over a wired or wireless connection.

When the mobile device location information includes satellite positioning information, the geographic location corresponding to the satellite positioning information maybe compared to the geographic location responding to the IP address of the computing system. If the geographic locations of the satellite positioning information and the IP address are in concurrence, then the access request may be authorized. Otherwise, access request may be denied.

When the mobile device location information includes connection information (that identifies a type of connection), the access request may be authorized when the connection between the mobile device the computing system has been established and remains present. As an example, a serial bus cable may be used to connect the mobile device to the computing device and establish wired connection. As another example, a wireless connection may be established directly or indirectly. A direct wireless connection they include a personal area wireless networking connection. An indirect wireless maybe through a wireless access point to which both the mobile device and the computing system are connected.

Multiple servers may be used to authorize aspects of the access request. When multiple servers are used, a server may send a subsequent request to a subsequent server to authorize a user identified from the access information. In some implementations, one server may authorize access to an encrypted file while a different server may generate the access package based on the access authorization.

At 435, the server 410 may generate the access package. When authorized, the server 410 generates an encryptor package in response to the encryption request from the access device 405-a. The encryptor package may generated by retrieving source code for an encryption function, generating and storing salts and keys for the file to be encrypted by the access device 405-a, and injecting the source code with information including the salts and keys. Generation of the access package may additionally or alternatively include identification of data payloads or values that are used to transform the data of the payload of the file.

A server may generate the access package by retrieving source code files and injecting the source code files with information. The injected information may include salts and keys for encrypting or decrypting data. The salts and keys are stored separately and are separated from the source code to reduce the impact of a compromise of the security of different parts of the system. For example, if an unauthorized user had a key for an encrypted file, the unauthorized user would still not have the other keys, the salts, or the decryption algorithm needed to access the encrypted file.

As an example, an access package for an encryption request (e.g., an encryptor package) may be generated by obtaining encryption source code, modifying the encryption source code with a set of salts and keys to form modified encryption source code, and generating the access package with the modified encryption source code. Similarly, an access package for a decryption request (e.g., a decryption package) may be generated by obtaining decryption source code, modifying the decryption source code with a set of salts and keys to form modified decryption source code, and generating the access package with the modified decryption source code.

At 440, the access package (which is an encryptor package) is sent from the server 410 to the access device 405-a. The access package (as well as the previous request) is sent over a secure link between the server 410 and the access device 405-a.

At 445, the access device 405-a (via the access client) may compile the access package. The access device 405-a may compile the source code from the access package to generate an executable, which may be a dynamic link library (DLL). The access package may be removed from the access device 405-a (e.g., from the device memory) after the executable is created. The access package may include source code written in multiple languages and use multiple compilers, assemblers, linkers, etc. to generate the executable from the access package. In some cases, at 445, the access device 405-a, rather than compiling the access package, may use the data payload or values in the access package to transform the data of the file or payload to be encrypted.

At 450, the access device 405-a (via the access client) may generate the data packs. The data packs may be generated as part of the encryption process. The data packs may include file access policies, ownership information, access logs, and the like. As describe the data packs may include several pieces of information that were injected into the source code of the access package and then stored in the data packs. As an example, an entity signature (or set of ownership information) may be injected into the source code and compiled into the executable, which stores the entity signature to the data packs of the encrypted file. Similarly, the file access policies may be injected into the source code and complied into the executable, which stores the file access policies to the data packs of the encrypted file.

At 455, the access device 405-a may encrypt the payload. The payload may be encrypted as part of the encryption process that generated the data packs. An encrypted file is generated from the encrypted payload and the data packs using multiple salts and encryption keys.

At 460, the access device 405-a may remove files, including the executable file after creation of the encrypted file.

At 465, the access device 405-a may transmit the encrypted file to the access device 405-b.

Figure 5:
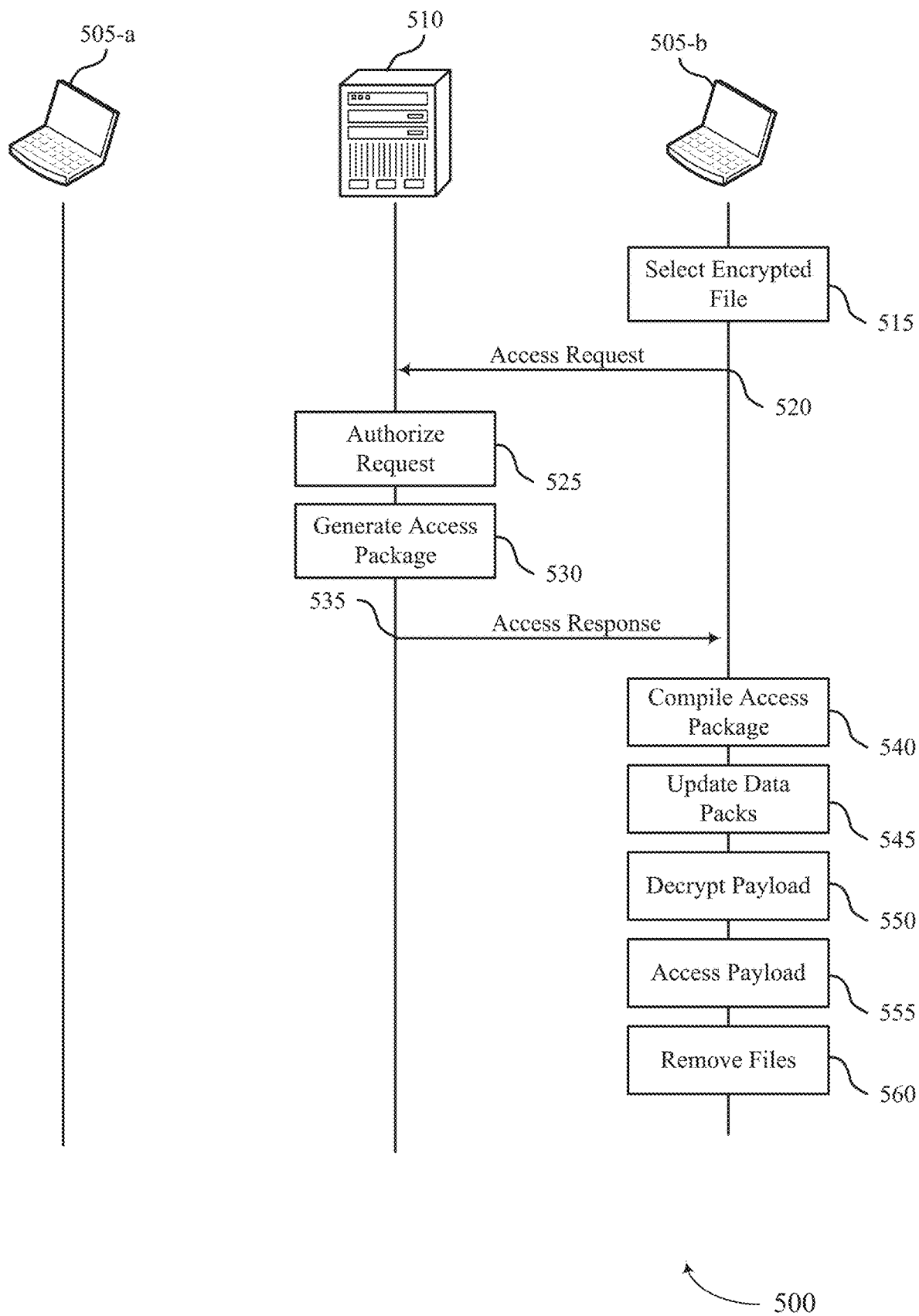
FIG. 5 illustrates an example of a process flow that supports encrypted file control in accordance with aspects of the present disclosure.

FIG. 5 illustrates an example of a process flow 500 that supports encrypted file control in accordance with aspects of the present disclosure. Specifically, process flow 500 illustrates operations for decrypting files according to the techniques described herein. The process flow 500 includes access devices 505 and a server 510, which may be examples of the corresponding devices described with respect to FIGS. 1 through 4. For example, the process flow 500 may be a continuation of process flow 400.

At 515, an encrypted file is selected at the access device 505-b. The encrypted file may be selected on the access device 505-b by the user of the access device 505-b. The encrypted file may be the file that was transmitted to the access device as described in FIG. 4.

At 520, the access device (e.g., via an application client) sends an access request to the server 510. The request, also referred to as a decryption request, may include access information that identifies the encrypted file, the user of the access device 505-b, and the access device 505-b. The request may include an identifier of the encrypted file that is linked to access rights information stored in the data packs and in a macro database of the server. The identifier of the encrypted file may be used by the server to locate information about the encrypted file (including user access rights) in the macro database maintained by the server. In some case, the information about the file may be identified from metadata associated with the file. The server may be identified via a API endpoint that is associated with the file (e.g., in the metadata) or via a configuration at the access client (e.g., the access client is preconfigured with the API endpoint).

At 525, the server 510 may authorize or validate the access request. The server may authorize the access request based on information included in the request an information maintained by the server in association with the file, such as access policies (e.g., user identifiers that are authorized to access the file).

At 530, the server 510 may generate an access package based on authorizing or validating the access request. The access package may be a decryptor package when the access request is authorized or may be a terminate or decoy package with the request is not authorized.

At 535, the server 510 may transmit the access package to the access device 505-b. The access package (as well as the prior request) may be transmitted over a secure link between the server 510 and the access device 505-b.

At 540, the access device 505-b may compile the access package. The access device 505-b (e.g., via the access client) may compile the source code from the access package to generate an executable, which may be a DLL. The access package may be removed from the access device 505-b after the executable is created. In some cases, at 540, the access device 405-a, rather than compiling the access package, may use the data payload or values in the access package to transform the data of the file or payload to be decrypted.

At 545, the access device 505-b may update the data packs of the file. The data packs may be updated by the access device 505-b as part of the decryption process by modifying the access logs (e.g., adding device information and user information associated with the access device 505-b). In some cases, updating the data packs may include updating the file access logs based on information included in the access package. Thus, the data packs may be decrypted and updated with access information that identifies the date and time of access and a hardware identifier of the computing system that performed the access. After the data packs are updated, an encryption process may be executed to regenerate the encrypted file with the updated data packs.

At 550, the access device 505-b may decrypt a payload of the encrypted file. The payload may be decrypted using the executable as part of the decryption process that updated the data packs. The encrypted file is decrypted to recover the original payload using multiple salts and encryption keys according to the executable code of the access package.

At 565, access device 505-b accesses the payload. The payload may be accessed to present information from the payload in accordance with the file access policies (e.g., user rights and privileges) for the encrypted file included in the data packs. The file access policies may limit editing, saving, printing, and viewing information from the encrypted file.

At 560, the access device 505-b may remove files, such as the executable, from memory of the access device 505-b.

In some examples, the access request at 520 is transmitted to a server associated with the access client executing on the access device 505-b. In such cases, the server associated with the access client may indicate that it is unable to validate the request (e.g., does not have access to the file information). In such cases, the server may reply with a response indicating the URL for the correct server (e.g., server 510). In other cases, the server may communicate with the correct server 510 in order to relay the access package to the access device 505-b.

Figure 6:
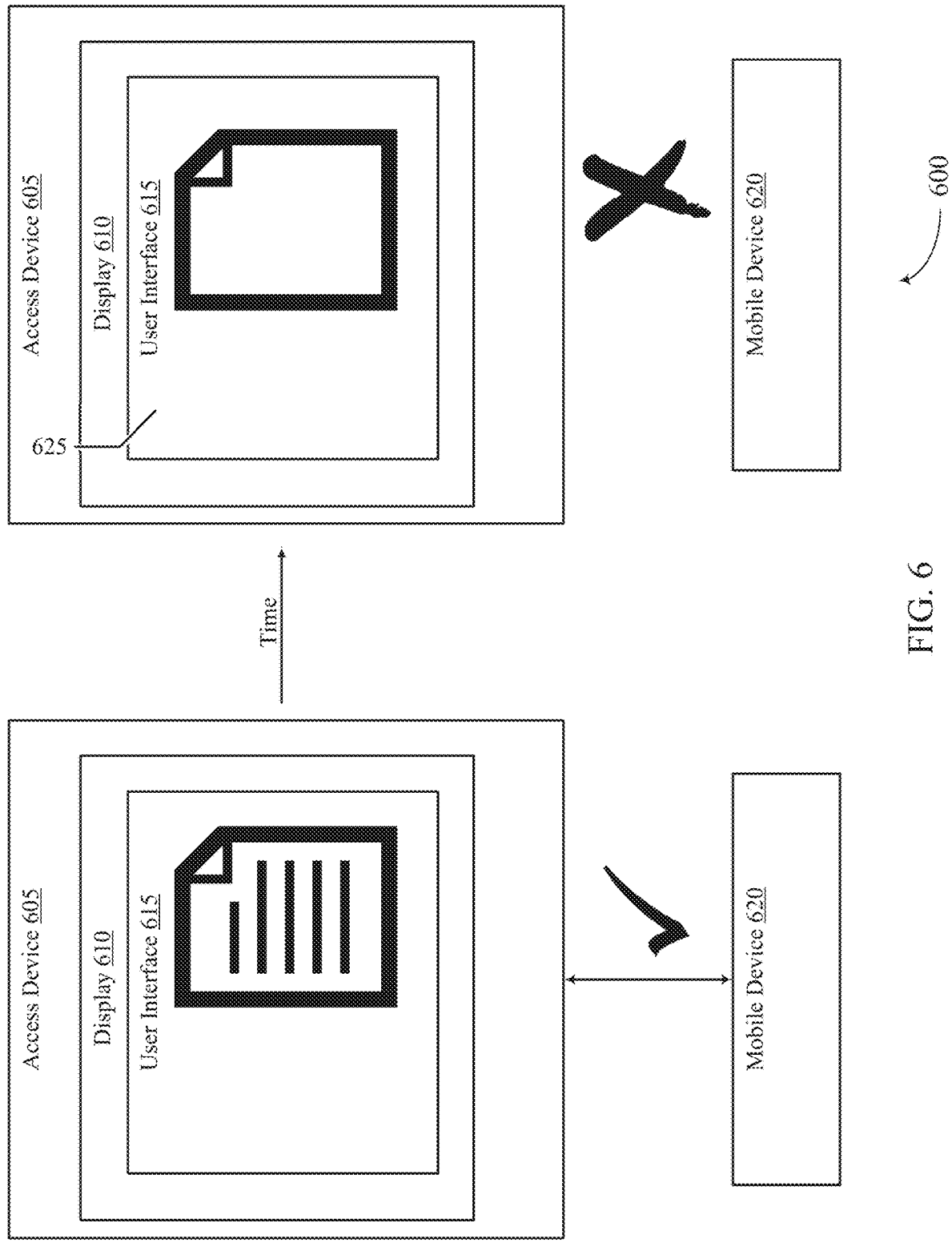
FIG. 6 illustrates an example of an access device scenario that supports encrypted file control in accordance with aspects of the present disclosure.

FIG. 6 illustrates an example of a access device scenario 600 that supports encrypted file control in accordance with aspects of the present disclosure. The access device scenario 600 includes a access device 605, which may be an example of the access devices described with respect to FIGS. 1 through 5. The access device 605 includes a display 610. The display 610 presents a user interface 615. The user interface may be an example user interface associated with an access client that is executing on the access device 605.

In the example of FIG. 6, the access client is accessing a file (e.g., the file is decrypted according to techniques described herein). The data pack associated with the file includes a file access policy that is mobile device proximity access policy which indicates that the user's mobile device is to have a connection with the access device 605 in order for the user to view the payload. Thus, the access client is enforcing the mobile device proximity access policy in FIG. 6.

At 625, user interface 615 displays the information (e.g., payload) from an encrypted file when a data connection is present with the mobile device 620. When the connection to the mobile device 620 is lost, the information is no longer displayed by the access device 605. As an example, the access device 605 may be a desktop computer and the mobile device 620 may be a smartphone. The access device 605 and the mobile device 620 are sufficiently close to be connected using one of multiple device connection standards (universal serial bus (USB), Wi-Fi, Bluetooth, etc.). Then the mobile device is taken far enough away from the access device 605 that the connection can no longer be maintained. After the connection drops, the information that was presented may disappear from the display because the access client is enforcing the mobile device proximity file access policy. Additionally, the encrypted file may be closed, and the executable used to decrypt the encrypted file may be removed from the access device 605. In some cases, the connection is periodically checked (e.g., every second) in order to enforce the policy included in the associated data package. Thus, the techniques of FIG. 6 may include further security mechanisms.

Figure 7:
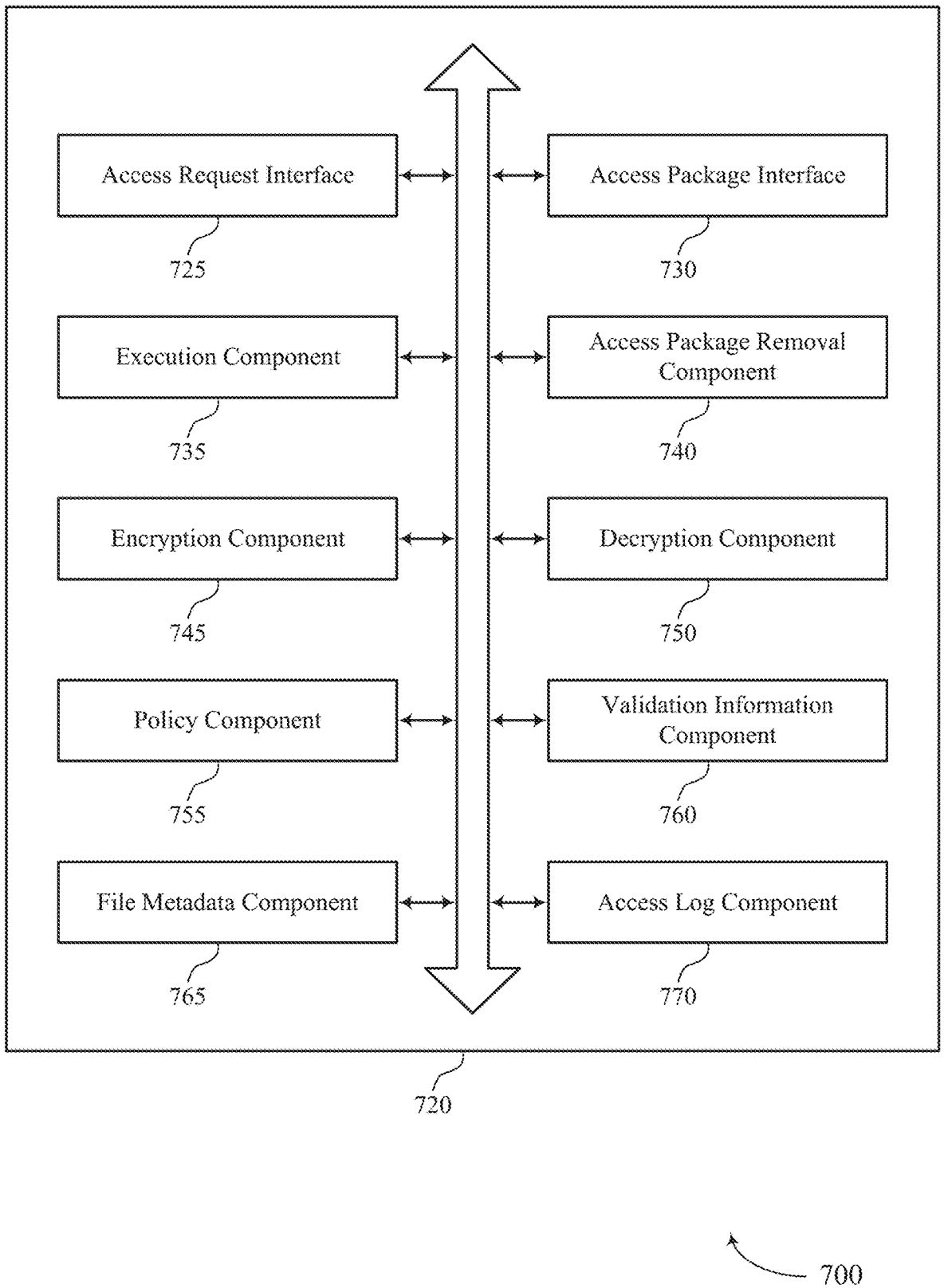
FIG. 7 shows a block diagram of a user device that supports encrypted file control in accordance with aspects of the present disclosure.

FIG. 7 shows a block diagram 700 of a user device 720 that supports encrypted file control in accordance with aspects of the present disclosure. The user device 720 may be an example of aspects of an access device (e.g., user device) as described with reference to FIGS. 1 through 6. The user device 720, or various components thereof, may be an example of means for performing various aspects of encrypted file control as described herein. For example, the user device 720 may include an access request interface 725, an access package interface 730, an execution component 735, an access package removal component 740, an encryption component 745, a decryption component 750, a policy component 755, a validation information component 760, a file metadata component 765, an access log component 770, or any combination thereof. Each of these components may communicate, directly or indirectly, with one another (e.g., via one or more buses).

The user device 720 may support data security at an access client in accordance with examples as disclosed herein. The access request interface 725 may be configured as or otherwise support a means for transmitting, to a server, an access request that includes access information and file information for a file to be accessed. The access package interface 730 may be configured as or otherwise support a means for receiving, from the server based at least in part on transmitting the access request, an access package that includes executable code and one or more access keys. The execution component 735 may be configured as or otherwise support a means for executing, by the access client, the executable code to access the file using the one or more access keys. The access package removal component 740 may be configured as or otherwise support a means for removing the access package from memory associated with the access client.

In some examples, to support transmitting the access request, the encryption component 745 may be configured as or otherwise support a means for transmitting, to the server, an encryption request and the file information.

In some examples, to support receiving the access package, the access package interface 730 may be configured as or otherwise support a means for receiving the access package that includes a data pack comprising an indication of one or more file access policies associated with the file, wherein the data pack is encrypted with the file using the one or more access keys. In some examples, the one or more file access policies include read access, write access, display constraints, or a combination thereof.

In some examples, to support receiving the access package, the access package interface 730 may be configured as or otherwise support a means for receiving the access package that includes a data pack comprising an indication of ownership information associated with the file, wherein the data pack is encrypted with the file using the one or more access keys.

In some examples, to support transmitting the encryption request, the policy component 755 may be configured as or otherwise support a means for transmitting, to the server, an indication of one or more file access policies associated the file.

In some examples, to support executing the executable code, the encryption component 745 may be configured as or otherwise support a means for encrypting, using the executable code, a payload and one or more data packs using the one or more access keys to generate an encrypted file.

In some examples, to support encrypting the one or more data packs, the encryption component 745 may be configured as or otherwise support a means for encrypting the one or more data packs that include an indication of one or more file access policies, file ownership information, a file access audit log, or a combination thereof.

In some examples, to support transmitting the access request, the decryption component 750 may be configured as or otherwise support a means for transmitting, to the server, a decryption request and the file information, wherein the executable code includes code that is used to decrypt the file.

In some examples, to support receiving the access package, the access package interface 730 may be configured as or otherwise support a means for receiving the access package that includes a data pack comprising one or more updated file access policies.

In some examples, the validation information component 760 may be configured as or otherwise support a means for identifying, at the access client, validation information that includes access client information, computer information, device information, geolocation information, an authentication token, or a combination thereof, wherein the decryption request includes an indication of the validation information.

In some examples, the file metadata component 765 may be configured as or otherwise support a means for identifying that the file is associated with the access client based at least in part on metadata associated with the file, wherein the file includes a payload encrypted using a first key of the one or more access keys and one or more encrypted data packs that are encrypted using at least one second key of the one or more access keys, wherein the decryption request is transmitted to the server based at least in part on the file being associated with the access client.

In some examples, to support executing the executable code, the decryption component 750 may be configured as or otherwise support a means for decrypting the file using the one or more access keys.

In some examples, the decryption component 750 may be configured as or otherwise support a means for displaying, at the access client, a payload of the file according to one or more access policies associated with the file.

In some examples, the one or more access policies include read access, write access, display constraints, or a combination thereof. In some examples, the one or more access policies are included in a data pack that was decrypted with the file using the one or more access keys.

In some examples, the access log component 770 may be configured as or otherwise support a means for updating a file access audit log to include device information associated with the access client, user information, geographic location information, or a combination thereof.

In some examples, the decryption component 750 may be configured as or otherwise support a means for identifying, based at least in part on decrypting the file, a payload and one or more data packs in the file, wherein the one or more data packs include an indication of one or more file access policies, ownership information, a file access audit log, or a combination thereof.

In some examples, the execution component 735 may be configured as or otherwise support a means for instantiating, in the memory associated with the access client and based at least in part on executing the executable code, an access object that is used to decrypt or encrypt the file, wherein the access object is removed from the memory associated with the access client after decryption or encryption of the file.

In some examples, the decryption component 750 may be configured as or otherwise support a means for transmitting, to the server, a decryption request and the file information, wherein the executable code includes code that is used to overwrite contents of the file.

In some examples, to support transmitting the access request, the access request interface 725 may be configured as or otherwise support a means for transmitting the access request that includes the access information comprising a geographical location of a user device executing the access client, device information associated with the user device, network information associated with the user device, an authentication token associated with the access client, or a combination thereof.

FIG. 8 shows a diagram of a system 800 including a device 805 that supports encrypted file control in accordance with aspects of the present disclosure. The device 805 may include components for bi-directional voice and data communications including components for transmitting and receiving communications, such as a data security manager 820, a communication module 810, an antenna 815, a user interface component 825, a database (application data) 830, a memory 835, and a processor 840. These components may be in electronic communication or otherwise coupled (e.g., operatively, communicatively, functionally, electronically, electrically) via one or more buses (e.g., a bus 845). The device 805 may be an example of a user device that executes an access client, as described herein. In some cases, the access client may correspond to the data security manager 820.

The communication module 810 may manage input and output signals for the device 805 via the antenna 815. The communication module 810 may include an example of the communication module 810 of the user device 106 shown and described in FIG. 2. In this regard, the communication module 810 may manage communications with the server 110, as illustrated in FIG. 2. The communication module 810 may also manage peripherals not integrated into the device 805. In some cases, the communication module 810 may represent a physical connection or port to an external peripheral. In some cases, the communication module 810 may utilize an operating system such as iOS®, ANDROID®, MS-DOS®, MS-WINDOWS®, OS/2®, UNIX®, LINUX®, or another known operating system. In other cases, the communication module 810 may represent or interact with a modem, a keyboard, a mouse, a touch-screen, or a similar device. In some cases, the communication module 810 may be implemented as part of the processor 840. In some examples, a user may interact with the device 805 via the communication module 810, user interface component 825, or via hardware components controlled by the communication module 810.

In some cases, the device 805 may include a single antenna 815. However, in some other cases, the device 805 may have more than one antenna 815, which may be capable of concurrently transmitting or receiving multiple wireless transmissions. The communication module 810 may communicate bi-directionally, via the one or more antennas 815, wired, or wireless links as described herein. For example, the communication module 810 may represent a wireless transceiver and may communicate bi-directionally with another wireless transceiver. The communication module 810 may also include a modem to modulate the packets, to provide the modulated packets to one or more antennas 815 for transmission, and to demodulate packets received from the one or more antennas 815.

The user interface component 825 may manage data storage and processing in a database 830. In some cases, a user may interact with the user interface component 825. In other cases, the user interface component 825 may operate automatically without user interaction. The database 830 may be an example of a single database, a distributed database, multiple distributed databases, a data store, a data lake, or an emergency backup database.

The memory 835 may include random-access memory (RAM) and read-only memory (ROM). The memory 835 may store computer-readable, computer-executable software including instructions that, when executed, cause the processor 840 to perform various functions described herein. In some cases, the memory 835 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory 835 to perform various functions (e.g., functions or tasks supporting a method and system for sleep staging algorithms).

The data security manager 820 may support data security at an access client in accordance with examples as disclosed herein. For example, the data security manager 820 may be configured as or otherwise support a means for transmitting, to a server, an access request that includes access information and file information for a file to be accessed. The data security manager 820 may be configured as or otherwise support a means for receiving, from the server based at least in part on transmitting the access request, an access package that includes executable code and one or more access keys. The data security manager 820 may be configured as or otherwise support a means for executing, by the access client, the executable code to access the file using the one or more access keys. The data security manager 820 may be configured as or otherwise support a means for removing the access package from memory associated with the access client.

The data security manager 820 may include an application (e.g., "app"), program, software, or other component which is configured to facilitate data security techniques described herein via communications with a server, other user devices, and the like.

Figure 9:
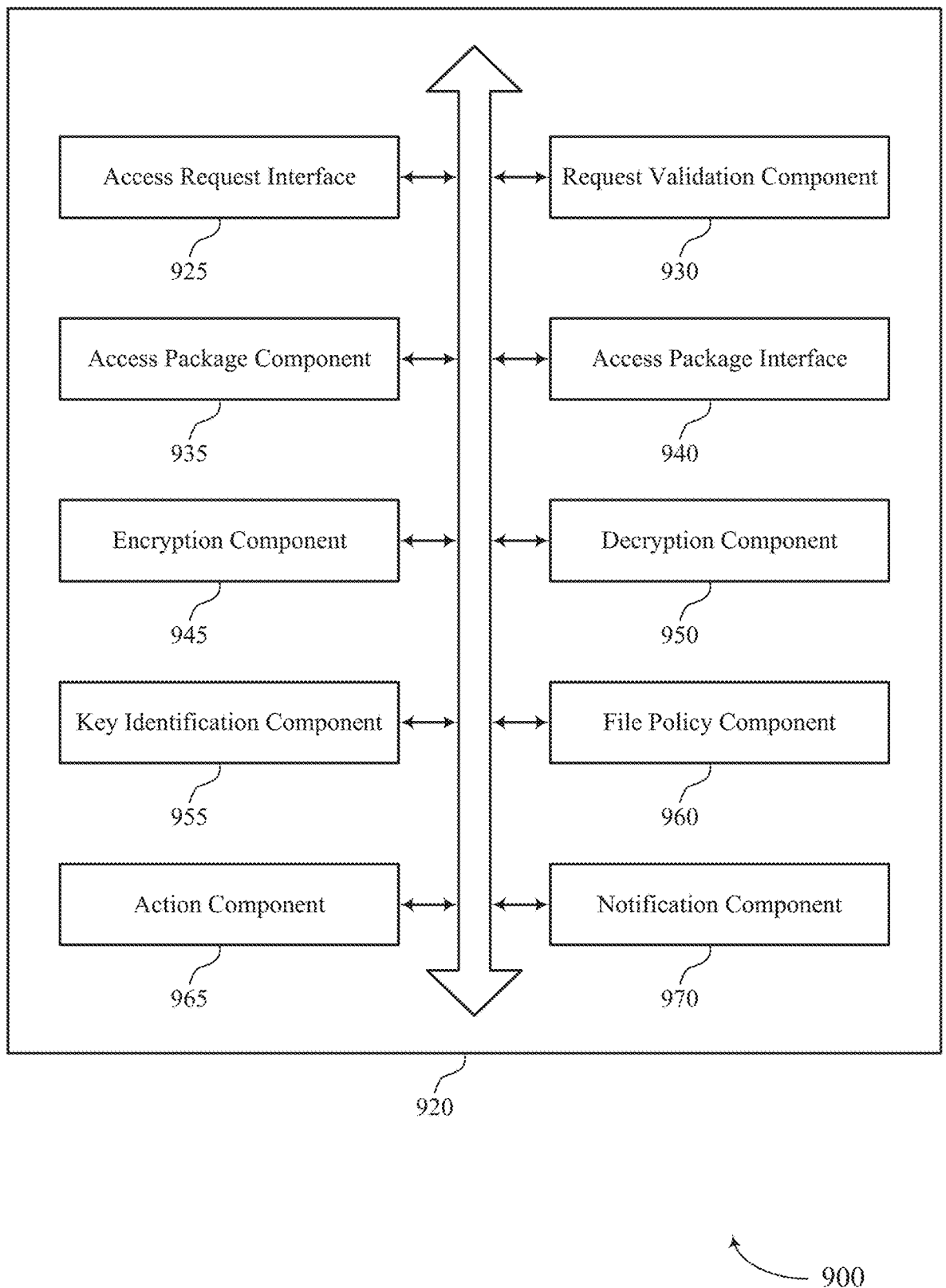
FIG. 9 shows a block diagram of a data security component that supports encrypted file control in accordance with aspects of the present disclosure.

FIG. 9 shows a block diagram 900 of a server 920 that supports encrypted file control in accordance with aspects of the present disclosure. The server 920 may be an example of aspects of a server as described with reference to FIGS. 1 through 6. The server 920, or various components thereof, may be an example of means for performing various aspects of encrypted file control as described herein. For example, the server 920 may include an access request interface 925, a request validation component 930, an access package component 935, an access package interface 940, an encryption component 945, a decryption component 950, a key identification component 955, a file policy component 960, an action component 965, a notification component 970, or any combination thereof. Each of these components may communicate, directly or indirectly, with one another (e.g., via one or more buses).

The server 920 may support data security at a server in accordance with examples as disclosed herein. The access request interface 925 may be configured as or otherwise support a means for receiving, from an access client, an access request that includes access information and file information for a file to be accessed. The request validation component 930 may be configured as or otherwise support a means for validating the access request using the access information. The access package component 935 may be configured as or otherwise support a means for generating, based at least in part on validating the access request, an access package that includes executable code and one or more access keys. The access package interface 940 may be configured as or otherwise support a means for transmitting, to the access client, the access package, wherein the access package is compliable, by the access client, to an executable that is used to access the file.

In some examples, to support receiving the access request, the encryption component 945 may be configured as or otherwise support a means for receiving, from the access client, an encryption request for encrypting the file, wherein the access package includes the executable code to encrypt the file using the one or more access keys.

In some examples, to support transmitting the access package, the access package interface 940 may be configured as or otherwise support a means for transmitting, to the access client, the access package that includes a data pack comprising an indication of one or more file access policies associated with the file, wherein the executable code is configured to encrypt the data pack with the file using the one or more access keys. In some examples, the one or more file access policies comprise read access, write access, display constraints, or a combination thereof.

In some examples, to support transmitting the access package, the access package component 935 may be configured as or otherwise support a means for transmitting, to the access client, the access package that includes a data pack comprising the executable code that is configured to generate an audit log associated with the file and encrypt the audit log with the file using the one or more access keys.

In some examples, to support transmitting the access package, the access package component 935 may be configured as or otherwise support a means for transmitting, to the access client, the access package that includes a data pack comprising an indication of ownership information associated with the file, wherein the executable code is configured to encrypt the data pack with the file using the one or more access keys.

In some examples, to support receiving the access request, the file policy component 960 may be configured as or otherwise support a means for receiving, from the access client, an indication of one or more file access policies associated with the file. In some examples, to support receiving the access request, the file policy component 960 may be configured as or otherwise support a means for storing, in association with a file identifier for the file, the one or more file access policies.

In some examples, to support receiving the access request, the file policy component 960 may be configured as or otherwise support a means for receiving, from the access client, an indication of one or more users that are authorized to access the file. In some examples, to support receiving the access request, the file policy component 960 may be configured as or otherwise support a means for storing, in association with a file identifier for the file, the indication of the one or more users that are authorized to access the file.

In some examples, to support receiving the access request, the decryption component 950 may be configured as or otherwise support a means for receiving, from the access client, a decryption request for decrypting the file, wherein the access package includes the executable code to decrypt the file using the one or more access keys.

In some examples, the file policy component 960 may be configured as or otherwise support a means for determining that a data pack that comprises one or more file access policies for the file is stale. In some examples, the file policy component 960 may be configured as or otherwise support a means for transmitting, based at least in part on determining that the data pack is stale, and updated data pack that includes one or more updated file access policies for the file.

In some examples, the request validation component 930 may be configured as or otherwise support a means for comparing, at the server, user information that is included in the access information received in the decryption request to an access record associated with the file. In some examples, the request validation component 930 may be configured as or otherwise support a means for determining that a user associated with the access client is authorized to access the file based at least in part on a result of the comparing, wherein the access package is transmitted to the access client based at least in part on determining that the user is authorized to access the file.

In some examples, the request validation component 930 may be configured as or otherwise support a means for determining that the access client is not authorized to decrypt the file based at least in part on the access information received in the decryption request. In some examples, the action component 965 may be configured as or otherwise support a means for triggering, at the server, an action based at least in part on determining that the access client is not authorized to decrypt the file.

In some examples, to support triggering the action, the notification component 970 may be configured as or otherwise support a means for generating an alert or message indicating that the access client transmitted an unauthorized access request.

In some examples, to support triggering the action, the access package component 935 may be configured as or otherwise support a means for transmitting the access package that includes the executable code to overwrite contents of the file.

In some examples, the key identification component 955 may be configured as or otherwise support a means for transmitting, to a key storage service and based at least in part on receiving the access request, a request for a key string and a file identifier associated with the file. In some examples, the key identification component 955 may be configured as or otherwise support a means for receiving, from the key storage service, the key string associated with the file identifier. In some examples, the key identification component 955 may be configured as or otherwise support a means for generating the one or more access keys using the key string.

In some examples, to support validating the access request, the request validation component 930 may be configured as or otherwise support a means for validating the access information that includes a geographical location of a user device executing the access client, device information associated with the user device, network information associated with the user device, an authentication token associated with the access client, for a combination thereof.

FIG. 10 shows a diagram of a system 1000 including a device 1005 that supports encrypted file control in accordance with aspects of the present disclosure. The device 1005 may include components for bi-directional voice and data communications including components for transmitting and receiving communications, such as a data security component 1020, an I/O controller 1010, a database controller 1015, a memory 1025, a processor 1030, and a database 1035. These components may be in electronic communication or otherwise coupled (e.g., operatively, communicatively, functionally, electronically, electrically) via one or more buses (e.g., a bus 1040).

The I/O controller 1010 may manage input signals 1045 and output signals 1050 for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. In other cases, the I/O controller 1010 may represent or interact with a modem, a keyboard, a mouse, a touchscreen, or a similar device. In some cases, the I/O controller 1010 may be implemented as part of a processor 1030. In some examples, a user may interact with the device 1005 via the I/O controller 1010 or via hardware components controlled by the I/O controller 1010.

The database controller 1015 may manage data storage and processing in a database 1035. In some cases, a user may interact with the database controller 1015. In other cases, the database controller 1015 may operate automatically without user interaction. The database 1035 may be an example of a single database, a distributed database, multiple distributed databases, a data store, a data lake, or an emergency backup database.

Memory 1025 may include RAM and ROM. The memory 1025 may store computer-readable, computer-executable software including instructions that, when executed, cause the processor 1030 to perform various functions described herein. In some cases, the memory 1025 may contain, among other things, a BIOS which may control basic hardware or software operation such as the interaction with peripheral components or devices.

The processor 1030 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1030 may be configured to operate a memory array using a memory controller. In other cases, a memory controller may be integrated into the processor 1030. The processor 1030 may be configured to execute computer-readable instructions stored in a memory 1025 to perform various functions (e.g., functions or tasks supporting encrypted file control).

The data security component 1020 may support data security at a server in accordance with examples as disclosed herein. For example, the data security component 1020 may be configured as or otherwise support a means for receiving, from an access client, an access request that includes access information and file information for a file to be accessed. The data security component 1020 may be configured as or otherwise support a means for validating the access request using the access information. The data security component 1020 may be configured as or otherwise support a means for generating, based at least in part on validating the access request, an access package that includes executable code and one or more access keys. The data security component 1020 may be configured as or otherwise support a means for transmitting, to the access client, the access package, wherein the access package is compliable, by the access client, to an executable that is used to access the file.

Figure 11:
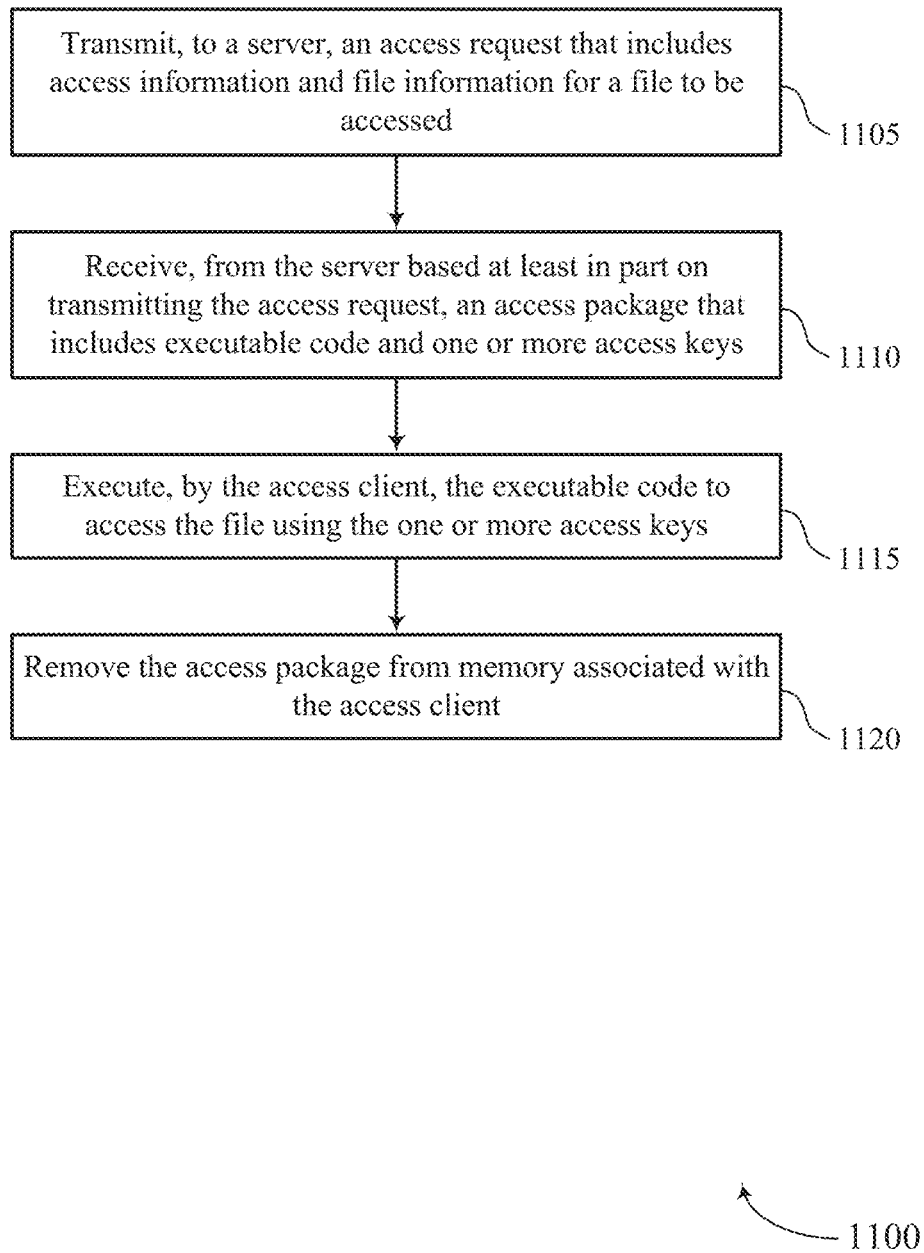
FIGS. 11 through 23 show flowcharts illustrating methods that support encrypted file control in accordance with aspects of the present disclosure.

FIG. 11 shows a flowchart illustrating a method 1100 that supports encrypted file control in accordance with aspects of the present disclosure. The operations of the method 1100 may be implemented by a user device or its components as described herein. For example, the operations of the method 1100 may be performed by a user device as described with reference to FIGS. 1 through 8. In some examples, a user device may execute a set of instructions to control the functional elements of the user device to perform the described functions. Additionally or alternatively, the user device may perform aspects of the described functions using special-purpose hardware.

At 1105, the method may include transmitting, to a server, an access request that includes access information and file information for a file to be accessed. The operations of 1105 may be performed in accordance with examples as disclosed herein. In some examples, aspects of the operations of 1105 may be performed by an access request interface 725 as described with reference to FIG. 7.

At 1110, the method may include receiving, from the server based at least in part on transmitting the access request, an access package that includes executable code and one or more access keys. The operations of 1110 may be performed in accordance with examples as disclosed herein. In some examples, aspects of the operations of 1110 may be performed by an access package interface 730 as described with reference to FIG. 7. In some examples, the access package includes the one or more access keys and/access information, such as data or values, rather than the executable code.

At 1115, the method may include executing, by the access client, the executable code to access the file using the one or more access keys. The operations of 1115 may be performed in accordance with examples as disclosed herein. In some examples, aspects of the operations of 1115 may be performed by an execution component 735 as described with reference to FIG. 7. In examples when the access package includes the one or more access keys and/or access information, the access device may use the access information in order to access the data of the payload by transforming the data, which may correspond to encrypting or decrypting the data. In some cases, this process may include executing instructions accessible by the access client. These instructions may or may not be included in the access package.

At 1120, the method may include removing the access package from memory associated with the access client. The operations of 1120 may be performed in accordance with examples as disclosed herein. In some examples, aspects of the operations of 1120 may be performed by an access package removal component 740 as described with reference to FIG. 7.

Figure 12:
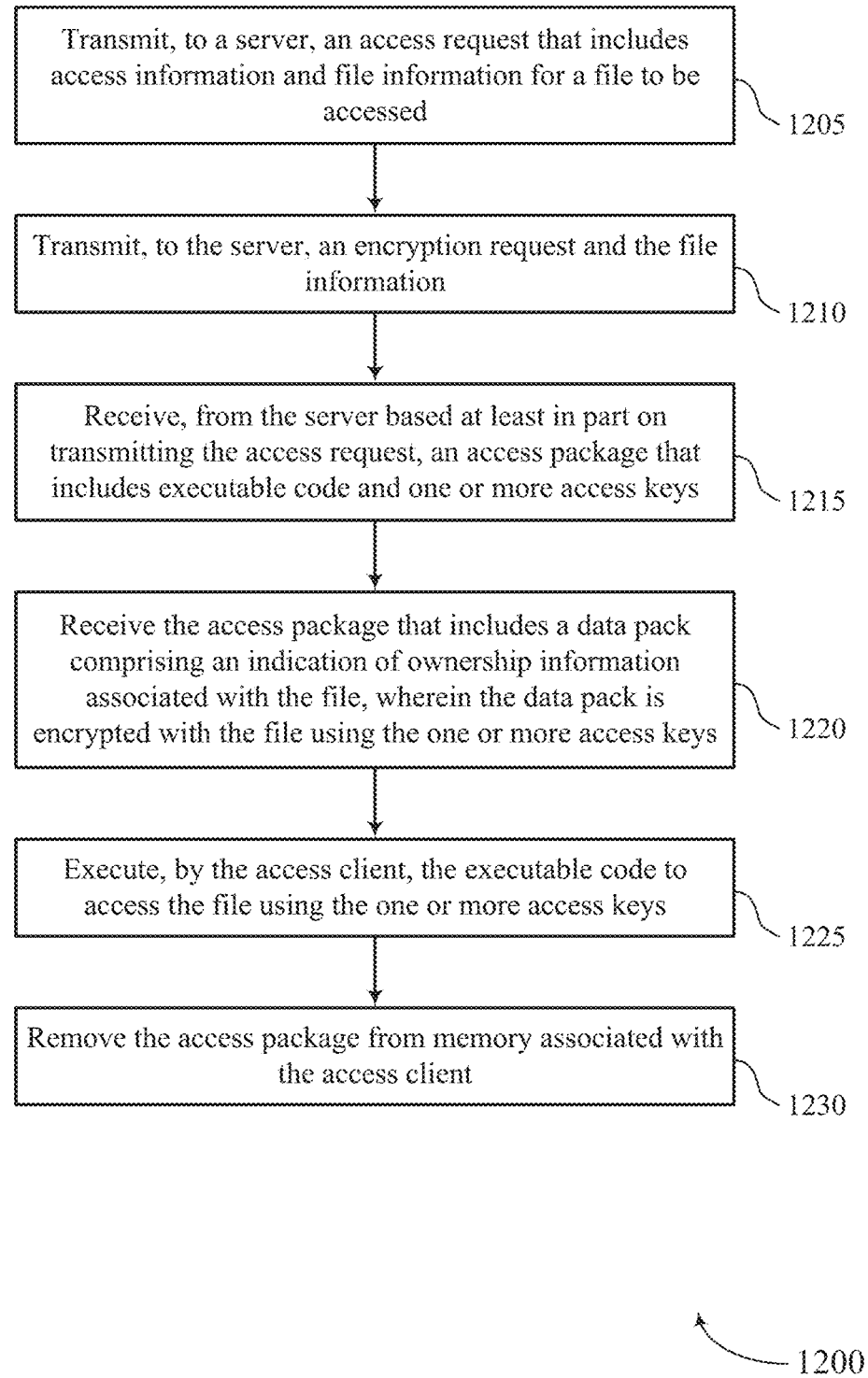

FIG. 12 shows a flowchart illustrating a method 1200 that supports encrypted file control in accordance with aspects of the present disclosure. The operations of the method 1200 may be implemented by a user device or its components as described herein. For example, the operations of the method 1200 may be performed by a user device as described with reference to FIGS. 1 through 8. In some examples, a user device may execute a set of instructions to control the functional elements of the user device to perform the described functions. Additionally or alternatively, the user device may perform aspects of the described functions using special-purpose hardware.

At 1205, the method may include transmitting, to a server, an access request that includes access information and file information for a file to be accessed. The operations of 1205 may be performed in accordance with examples as disclosed herein. In some examples, aspects of the operations of 1205 may be performed by an access request interface 725 as described with reference to FIG. 7.

At 1210, the method may include transmitting, to the server, an encryption request and the file information. The operations of 1210 may be performed in accordance with examples as disclosed herein. In some examples, aspects of the operations of 1210 may be performed by an encryption component 745 as described with reference to FIG. 7.

At 1215, the method may include receiving, from the server based at least in part on transmitting the access request, an access package that includes executable code and one or more access keys. The operations of 1215 may be performed in accordance with examples as disclosed herein. In some examples, aspects of the operations of 1215 may be performed by an access package interface 730 as described with reference to FIG. 7.

At 1220, the method may include receiving the access package that includes a data pack comprising an indication of ownership information associated with the file, wherein the data pack is encrypted with the file using the one or more access keys. The operations of 1220 may be performed in accordance with examples as disclosed herein. In some examples, aspects of the operations of 1220 may be performed by an access package interface 730 as described with reference to FIG. 7.

At 1225, the method may include executing, by the access client, the executable code to access the file using the one or more access keys. The operations of 1225 may be performed in accordance with examples as disclosed herein. In some examples, aspects of the operations of 1225 may be performed by an execution component 735 as described with reference to FIG. 7.

At 1230, the method may include removing the access package from memory associated with the access client. The operations of 1230 may be performed in accordance with examples as disclosed herein. In some examples, aspects of the operations of 1230 may be performed by an access package removal component 740 as described with reference to FIG. 7.

Figure 13:
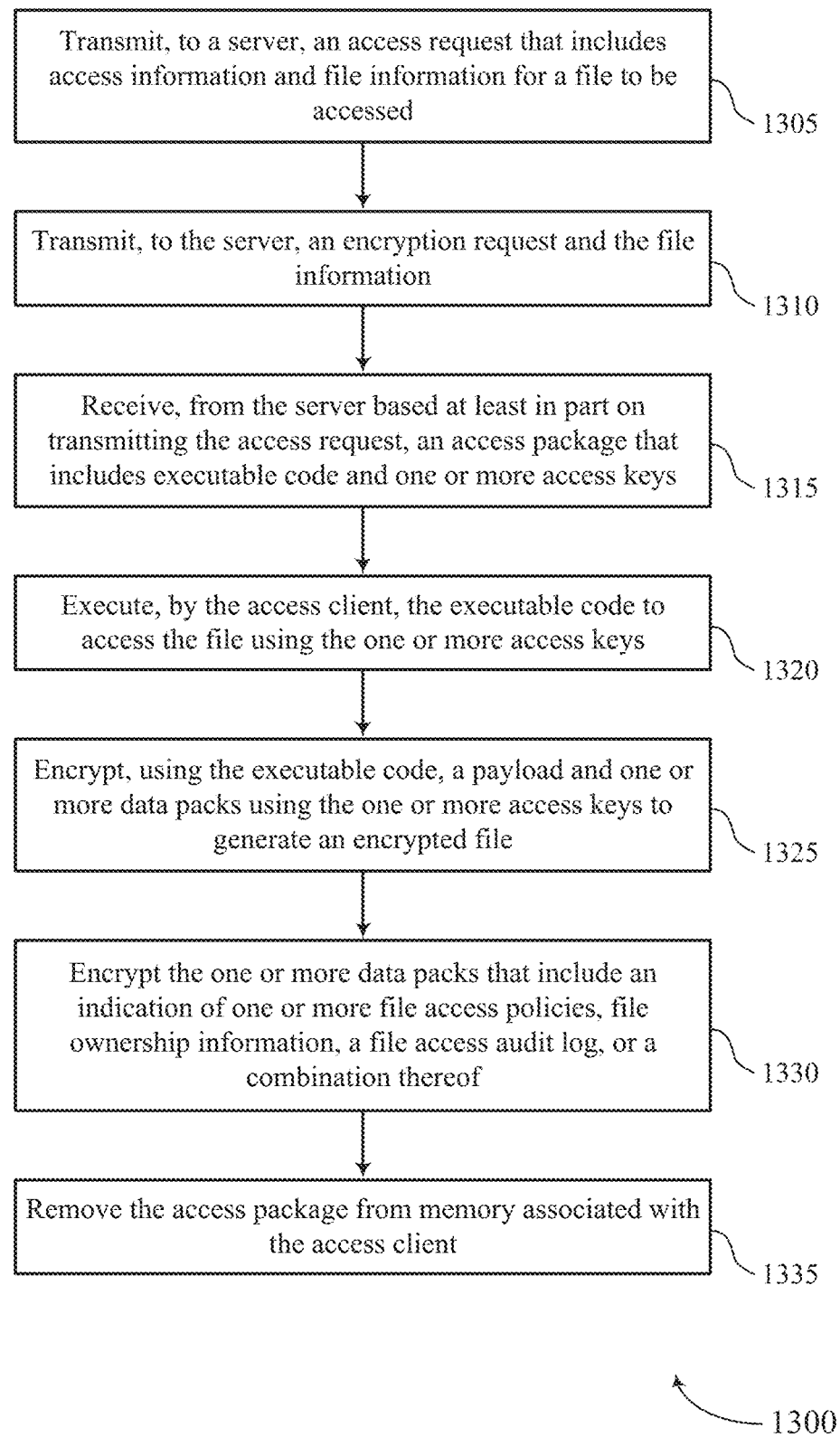

FIG. 13 shows a flowchart illustrating a method 1300 that supports encrypted file control in accordance with aspects of the present disclosure. The operations of the method 1300 may be implemented by a user device or its components as described herein. For example, the operations of the method 1300 may be performed by a user device as described with reference to FIGS. 1 through 8. In some examples, a user device may execute a set of instructions to control the functional elements of the user device to perform the described functions. Additionally or alternatively, the user device may perform aspects of the described functions using special-purpose hardware.

At 1305, the method may include transmitting, to a server, an access request that includes access information and file information for a file to be accessed. The operations of 1305 may be performed in accordance with examples as disclosed herein. In some examples, aspects of the operations of 1305 may be performed by an access request interface 725 as described with reference to FIG. 7.

At 1310, the method may include transmitting, to the server, an encryption request and the file information. The operations of 1310 may be performed in accordance with examples as disclosed herein. In some examples, aspects of the operations of 1310 may be performed by an encryption component 745 as described with reference to FIG. 7.

At 1315, the method may include receiving, from the server based at least in part on transmitting the access request, an access package that includes executable code and one or more access keys. The operations of 1315 may be performed in accordance with examples as disclosed herein. In some examples, aspects of the operations of 1315 may be performed by an access package interface 730 as described with reference to FIG. 7.

At 1320, the method may include executing, by the access client, the executable code to access the file using the one or more access keys. The operations of 1320 may be performed in accordance with examples as disclosed herein. In some examples, aspects of the operations of 1320 may be performed by an execution component 735 as described with reference to FIG. 7.

At 1325, the method may include encrypting, using the executable code, a payload and one or more data packs using the one or more access keys to generate an encrypted file. The operations of 1325 may be performed in accordance with examples as disclosed herein. In some examples, aspects of the operations of 1325 may be performed by an encryption component 745 as described with reference to FIG. 7.

At 1330, the method may include encrypting the one or more data packs that include an indication of one or more file access policies, file ownership information, a file access audit log, or a combination thereof. The operations of 1330 may be performed in accordance with examples as disclosed herein. In some examples, aspects of the operations of 1330 may be performed by an encryption component 745 as described with reference to FIG. 7.

At 1335, the method may include removing the access package from memory associated with the access client. The operations of 1335 may be performed in accordance with examples as disclosed herein. In some examples, aspects of the operations of 1335 may be performed by an access package removal component 740 as described with reference to FIG. 7.

Figure 14:
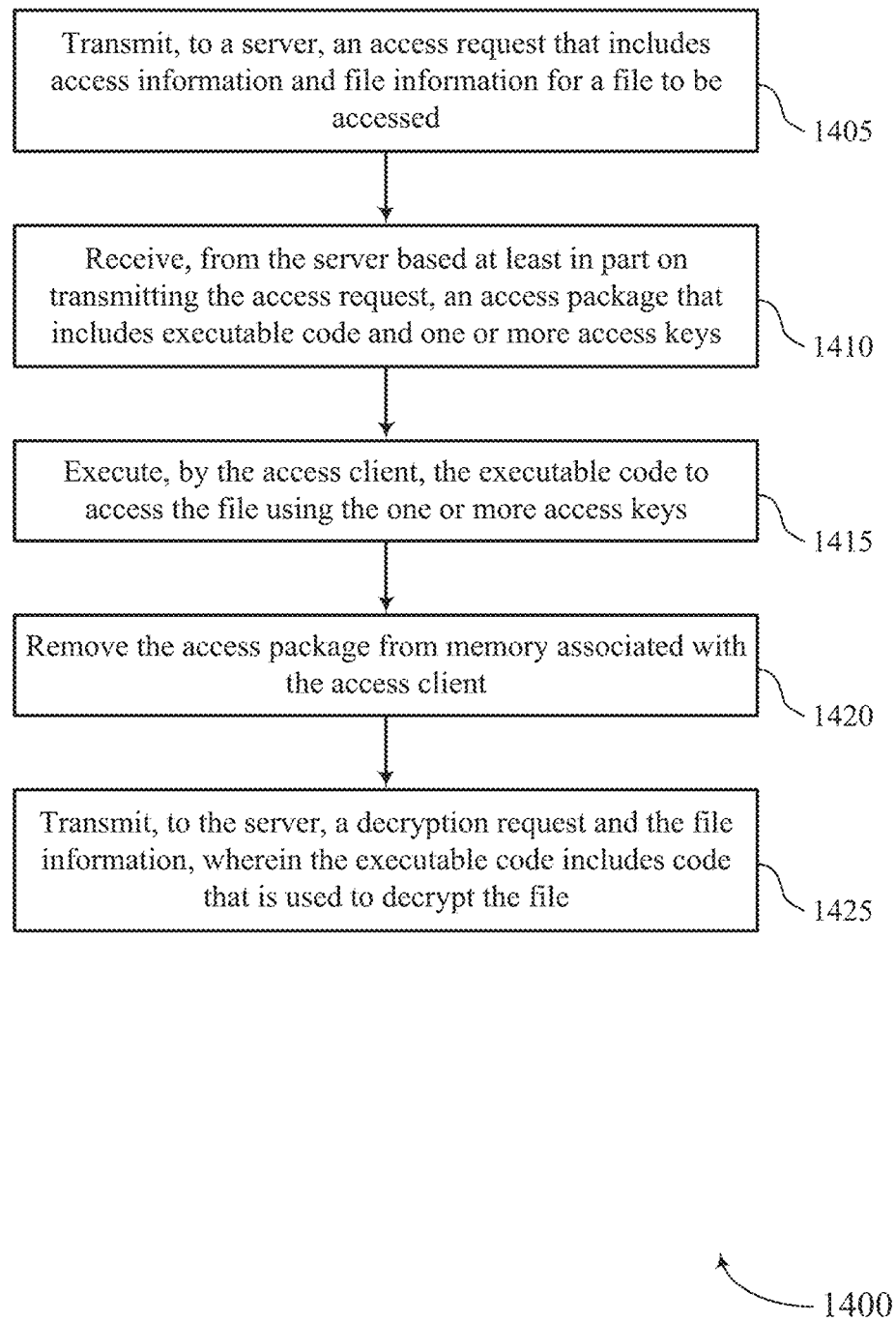

FIG. 14 shows a flowchart illustrating a method 1400 that supports encrypted file control in accordance with aspects of the present disclosure. The operations of the method 1400 may be implemented by a user device or its components as described herein. For example, the operations of the method 1400 may be performed by a user device as described with reference to FIGS. 1 through 8. In some examples, a user device may execute a set of instructions to control the functional elements of the user device to perform the described functions. Additionally or alternatively, the user device may perform aspects of the described functions using special-purpose hardware.

At 1405, the method may include transmitting, to a server, an access request that includes access information and file information for a file to be accessed. The operations of 1405 may be performed in accordance with examples as disclosed herein. In some examples, aspects of the operations of 1405 may be performed by an access request interface 725 as described with reference to FIG. 7.

At 1410, the method may include receiving, from the server based at least in part on transmitting the access request, an access package that includes executable code and one or more access keys. The operations of 1410 may be performed in accordance with examples as disclosed herein. In some examples, aspects of the operations of 1410 may be performed by an access package interface 730 as described with reference to FIG. 7.

At 1415, the method may include executing, by the access client, the executable code to access the file using the one or more access keys. The operations of 1415 may be performed in accordance with examples as disclosed herein. In some examples, aspects of the operations of 1415 may be performed by an execution component 735 as described with reference to FIG. 7.

At 1420, the method may include removing the access package from memory associated with the access client. The operations of 1420 may be performed in accordance with examples as disclosed herein. In some examples, aspects of the operations of 1420 may be performed by an access package removal component 740 as described with reference to FIG. 7.

At 1425, the method may include transmitting, to the server, a decryption request and the file information, wherein the executable code includes code that is used to decrypt the file. The operations of 1425 may be performed in accordance with examples as disclosed herein. In some examples, aspects of the operations of 1425 may be performed by a decryption component 750 as described with reference to FIG. 7.

Figure 15:
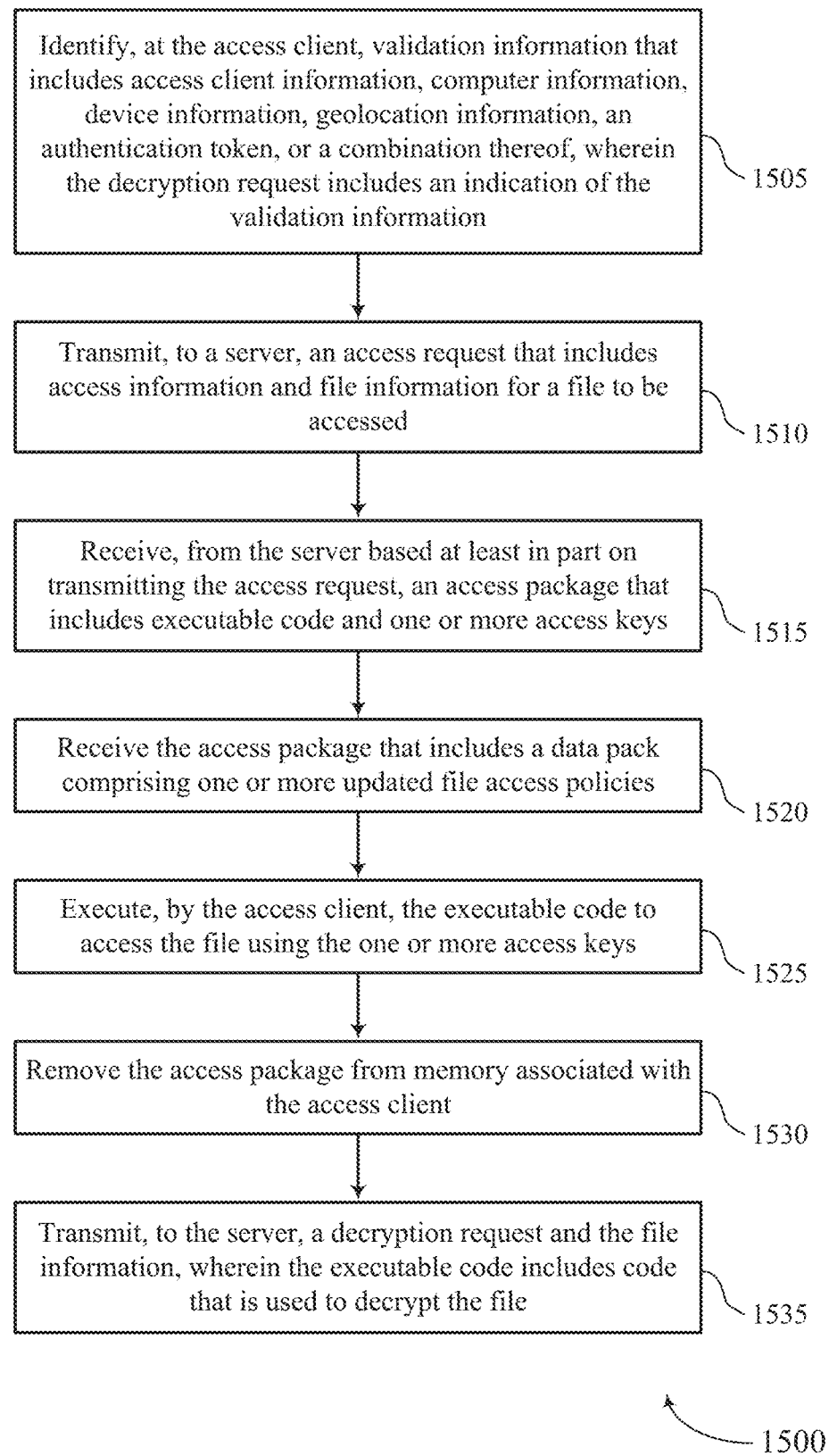

FIG. 15 shows a flowchart illustrating a method 1500 that supports encrypted file control in accordance with aspects of the present disclosure. The operations of the method 1500 may be implemented by a user device or its components as described herein. For example, the operations of the method 1500 may be performed by a user device as described with reference to FIGS. 1 through 8. In some examples, a user device may execute a set of instructions to control the functional elements of the user device to perform the described functions. Additionally or alternatively, the user device may perform aspects of the described functions using special-purpose hardware.

At 1505, the method may include identifying, at the access client, validation information that includes access client information, computer information, device information, geolocation information, an authentication token, or a combination thereof, wherein the decryption request includes an indication of the validation information. The operations of 1505 may be performed in accordance with examples as disclosed herein. In some examples, aspects of the operations of 1505 may be performed by a validation information component 760 as described with reference to FIG. 7.

At 1510, the method may include transmitting, to a server, an access request that includes access information and file information for a file to be accessed. The operations of 1510 may be performed in accordance with examples as disclosed herein. In some examples, aspects of the operations of 1510 may be performed by an access request interface 725 as described with reference to FIG. 7.

At 1515, the method may include receiving, from the server based at least in part on transmitting the access request, an access package that includes executable code and one or more access keys. The operations of 1515 may be performed in accordance with examples as disclosed herein. In some examples, aspects of the operations of 1515 may be performed by an access package interface 730 as described with reference to FIG. 7.

At 1520, the method may include receiving the access package that includes a data pack comprising one or more updated file access policies. The operations of 1520 may be performed in accordance with examples as disclosed herein. In some examples, aspects of the operations of 1520 may be performed by an access package interface 730 as described with reference to FIG. 7.

At 1525, the method may include executing, by the access client, the executable code to access the file using the one or more access keys. The operations of 1525 may be performed in accordance with examples as disclosed herein. In some examples, aspects of the operations of 1525 may be performed by an execution component 735 as described with reference to FIG. 7.

At 1530, the method may include removing the access package from memory associated with the access client. The operations of 1530 may be performed in accordance with examples as disclosed herein. In some examples, aspects of the operations of 1530 may be performed by an access package removal component 740 as described with reference to FIG. 7.

At 1535, the method may include transmitting, to the server, a decryption request and the file information, wherein the executable code includes code that is used to decrypt the file. The operations of 1535 may be performed in accordance with examples as disclosed herein. In some examples, aspects of the operations of 1535 may be performed by a decryption component 750 as described with reference to FIG. 7.

Figure 16:
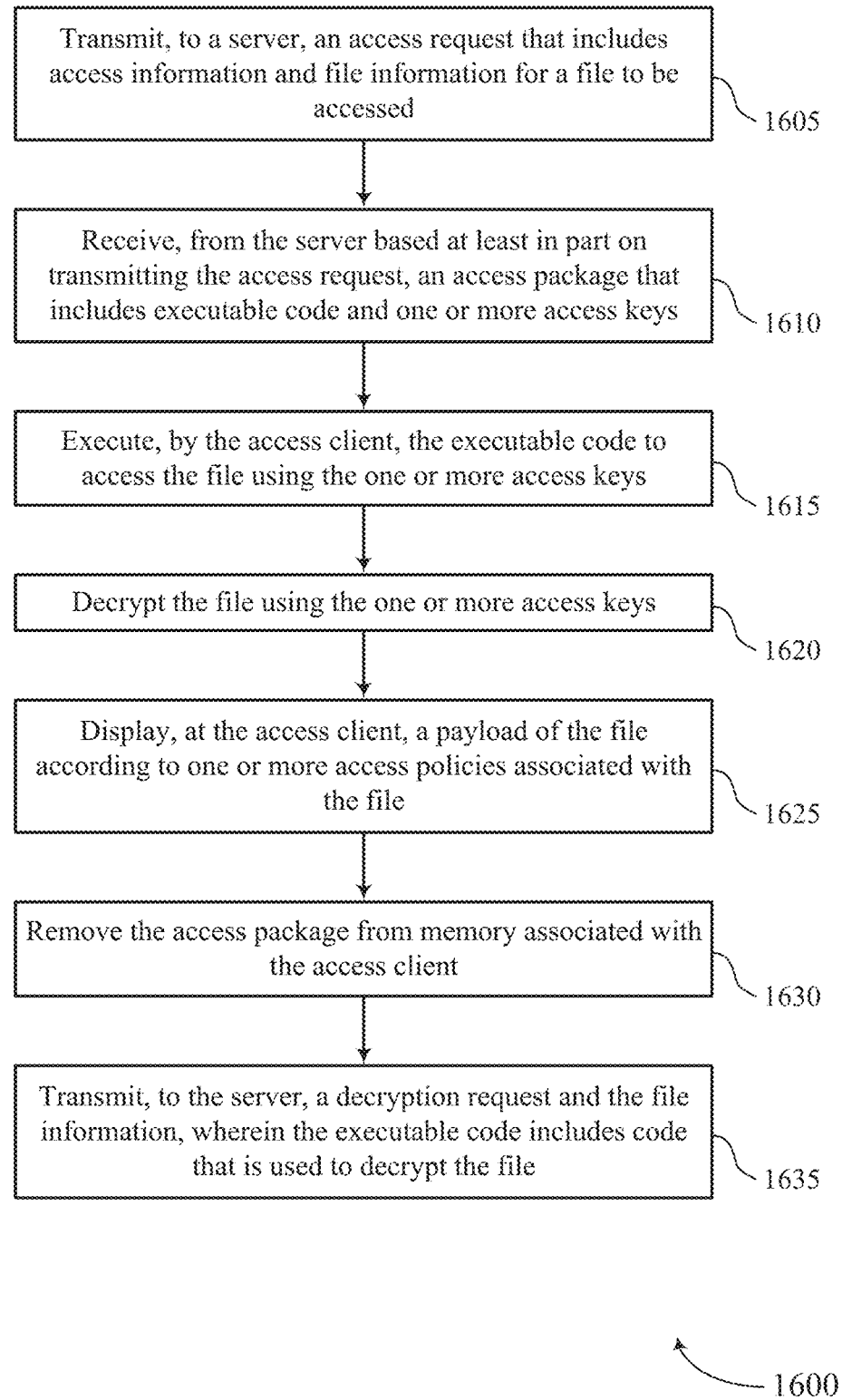

FIG. 16 shows a flowchart illustrating a method 1600 that supports encrypted file control in accordance with aspects of the present disclosure. The operations of the method 1600 may be implemented by a user device or its components as described herein. For example, the operations of the method 1600 may be performed by a user device as described with reference to FIGS. 1 through 8. In some examples, a user device may execute a set of instructions to control the functional elements of the user device to perform the described functions. Additionally or alternatively, the user device may perform aspects of the described functions using special-purpose hardware.

At 1605, the method may include transmitting, to a server, an access request that includes access information and file information for a file to be accessed. The operations of 1605 may be performed in accordance with examples as disclosed herein. In some examples, aspects of the operations of 1605 may be performed by an access request interface 725 as described with reference to FIG. 7.

At 1610, the method may include receiving, from the server based at least in part on transmitting the access request, an access package that includes executable code and one or more access keys. The operations of 1610 may be performed in accordance with examples as disclosed herein. In some examples, aspects of the operations of 1610 may be performed by an access package interface 730 as described with reference to FIG. 7.

At 1615, the method may include executing, by the access client, the executable code to access the file using the one or more access keys. The operations of 1615 may be performed in accordance with examples as disclosed herein. In some examples, aspects of the operations of 1615 may be performed by an execution component 735 as described with reference to FIG. 7.

At 1620, the method may include decrypting the file using the one or more access keys. The operations of 1620 may be performed in accordance with examples as disclosed herein. In some examples, aspects of the operations of 1620 may be performed by a decryption component 750 as described with reference to FIG. 7.

At 1625, the method may include displaying, at the access client, a payload of the file according to one or more access policies associated with the file. The operations of 1625 may be performed in accordance with examples as disclosed herein. In some examples, aspects of the operations of 1625 may be performed by a decryption component 750 as described with reference to FIG. 7.

At 1630, the method may include removing the access package from memory associated with the access client. The operations of 1630 may be performed in accordance with examples as disclosed herein. In some examples, aspects of the operations of 1630 may be performed by an access package removal component 740 as described with reference to FIG. 7.

At 1635, the method may include transmitting, to the server, a decryption request and the file information, wherein the executable code includes code that is used to decrypt the file. The operations of 1635 may be performed in accordance with examples as disclosed herein. In some examples, aspects of the operations of 1635 may be performed by a decryption component 750 as described with reference to FIG. 7.

Figure 17:
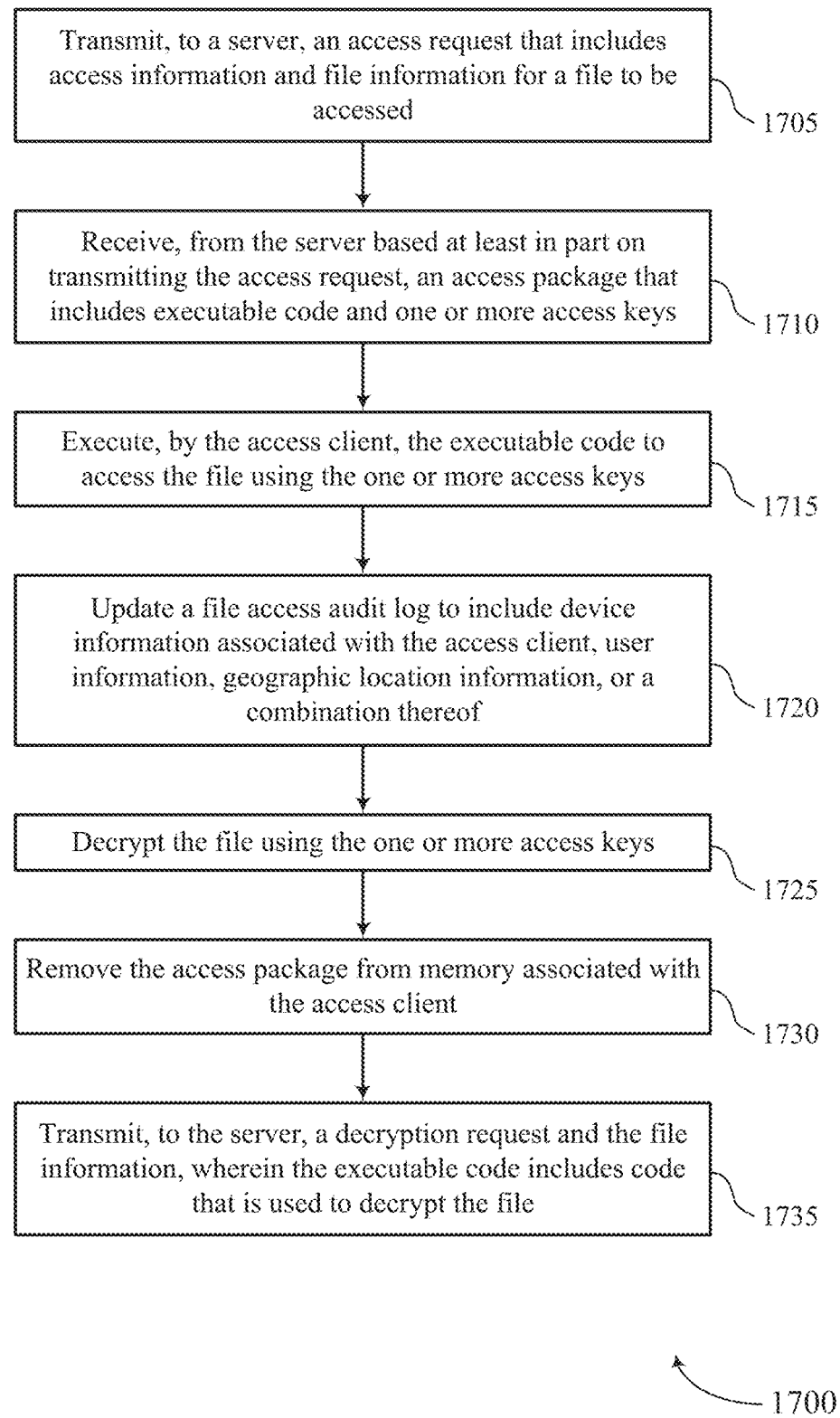

FIG. 17 shows a flowchart illustrating a method 1700 that supports encrypted file control in accordance with aspects of the present disclosure. The operations of the method 1700 may be implemented by a user device or its components as described herein. For example, the operations of the method 1700 may be performed by a user device as described with reference to FIGS. 1 through 8. In some examples, a user device may execute a set of instructions to control the functional elements of the user device to perform the described functions. Additionally or alternatively, the user device may perform aspects of the described functions using special-purpose hardware.

At 1705, the method may include transmitting, to a server, an access request that includes access information and file information for a file to be accessed. The operations of 1705 may be performed in accordance with examples as disclosed herein. In some examples, aspects of the operations of 1705 may be performed by an access request interface 725 as described with reference to FIG. 7.

At 1710, the method may include receiving, from the server based at least in part on transmitting the access request, an access package that includes executable code and one or more access keys. The operations of 1710 may be performed in accordance with examples as disclosed herein. In some examples, aspects of the operations of 1710 may be performed by an access package interface 730 as described with reference to FIG. 7.

At 1715, the method may include executing, by the access client, the executable code to access the file using the one or more access keys. The operations of 1715 may be performed in accordance with examples as disclosed herein. In some examples, aspects of the operations of 1715 may be performed by an execution component 735 as described with reference to FIG. 7.

At 1720, the method may include decrypting the file using the one or more access keys. The operations of 1720 may be performed in accordance with examples as disclosed herein. In some examples, aspects of the operations of 1720 may be performed by a decryption component 750 as described with reference to FIG. 7.

At 1725, the method may include updating a file access audit log to include device information associated with the access client, user information, geographic location information, or a combination thereof. The operations of 1725 may be performed in accordance with examples as disclosed herein. In some examples, aspects of the operations of 1725 may be performed by an access log component 770 as described with reference to FIG. 7.

At 1730, the method may include removing the access package from memory associated with the access client. The operations of 1730 may be performed in accordance with examples as disclosed herein. In some examples, aspects of the operations of 1730 may be performed by an access package removal component 740 as described with reference to FIG. 7.

At 1735, the method may include transmitting, to the server, a decryption request and the file information, wherein the executable code includes code that is used to decrypt the file. The operations of 1735 may be performed in accordance with examples as disclosed herein. In some examples, aspects of the operations of 1735 may be performed by a decryption component 750 as described with reference to FIG. 7.

Figure 18:
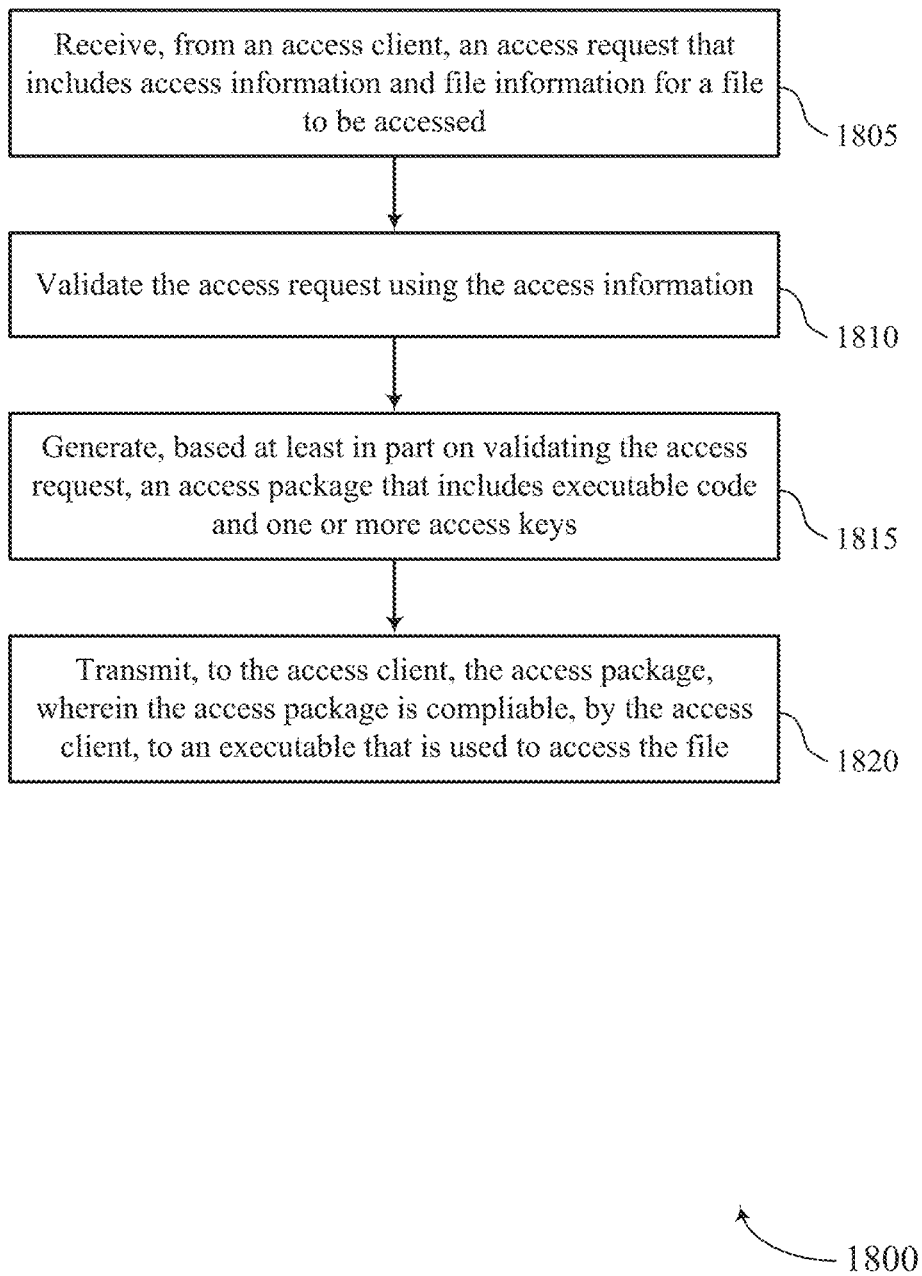

FIG. 18 shows a flowchart illustrating a method 1800 that supports encrypted file control in accordance with aspects of the present disclosure. The operations of the method 1800 may be implemented by a server or its components as described herein. For example, the operations of the method 1800 may be performed by a server as described with reference to FIGS. 1 through 6 and 9 and 10. In some examples, a server may execute a set of instructions to control the functional elements of the server to perform the described functions. Additionally or alternatively, the server may perform aspects of the described functions using special-purpose hardware.

At 1805, the method may include receiving, from an access client, an access request that includes access information and file information for a file to be accessed. The operations of 1805 may be performed in accordance with examples as disclosed herein. In some examples, aspects of the operations of 1805 may be performed by an access request interface 925 as described with reference to FIG. 9.

At 1810, the method may include validating the access request using the access information. The operations of 1810 may be performed in accordance with examples as disclosed herein. In some examples, aspects of the operations of 1810 may be performed by a request validation component 930 as described with reference to FIG. 9.

At 1815, the method may include generating, based at least in part on validating the access request, an access package that includes executable code and one or more access keys. The operations of 1815 may be performed in accordance with examples as disclosed herein. In some examples, aspects of the operations of 1815 may be performed by an access package component 935 as described with reference to FIG. 9. In some examples, generating the access package may include identifying the one or more access keys and/or access information, such as data or values, rather than executable code.

At 1820, the method may include transmitting, to the access client, the access package, wherein the access package is compliable, by the access client, to an executable that is used to access the file. The operations of 1820 may be performed in accordance with examples as disclosed herein. In some examples, aspects of the operations of 1820 may be performed by an access package interface 940 as described with reference to FIG. 9. When the access package includes the access information, the access client may use the access information to access the data of the payload by transforming the data, which may correspond to encrypting or decrypting the data. In some cases, this process may include executing instructions accessible by the access client. These instructions may or may not be included in the access package.

Figure 19:
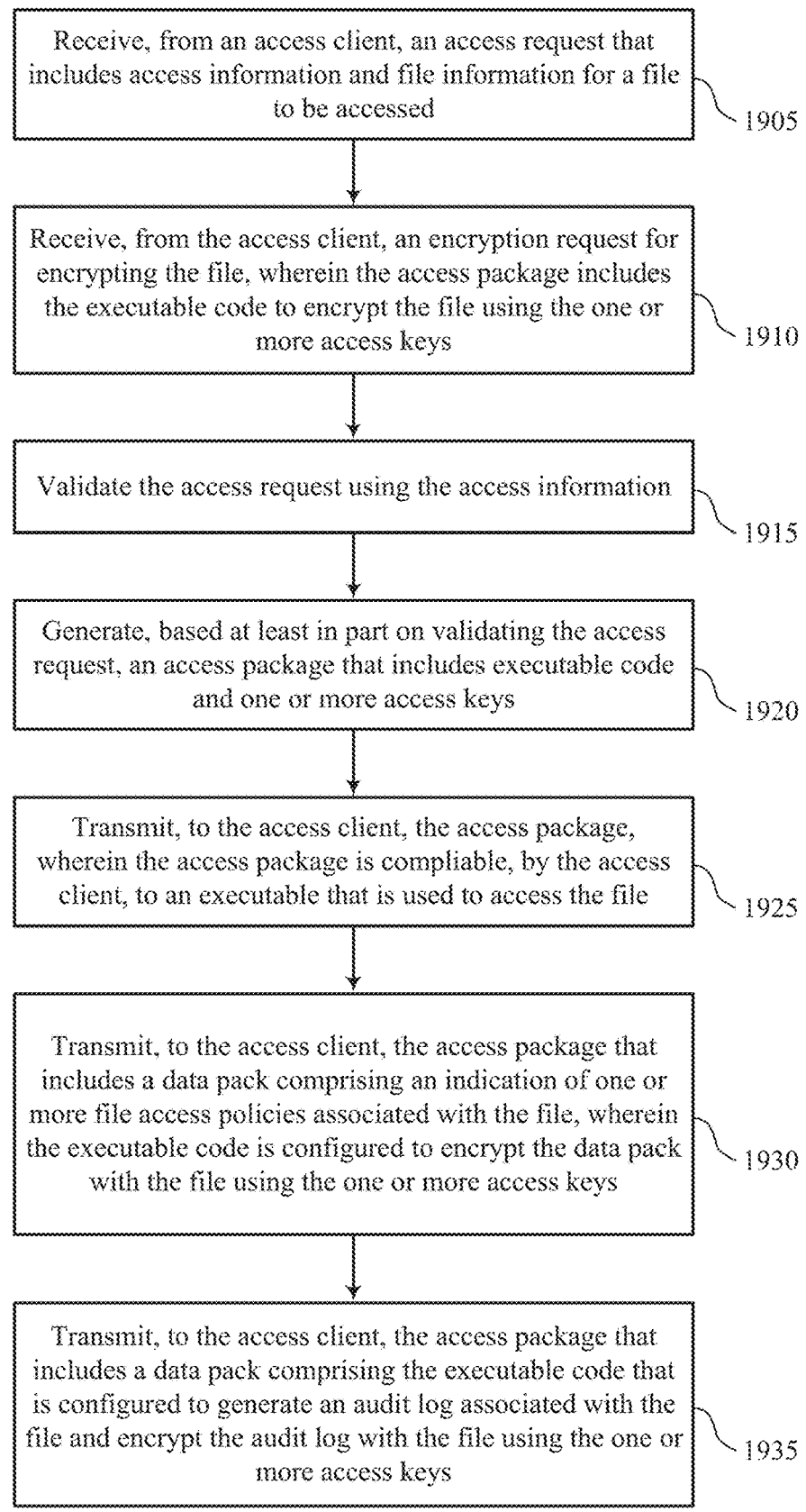

FIG. 19 shows a flowchart illustrating a method 1900 that supports encrypted file control in accordance with aspects of the present disclosure. The operations of the method 1900 may be implemented by a server or its components as described herein. For example, the operations of the method 1900 may be performed by a server as described with reference to FIGS. 1 through 6 and 9 and 10. In some examples, a server may execute a set of instructions to control the functional elements of the server to perform the described functions. Additionally or alternatively, the server may perform aspects of the described functions using special-purpose hardware.

At 1905, the method may include receiving, from an access client, an access request that includes access information and file information for a file to be accessed. The operations of 1905 may be performed in accordance with examples as disclosed herein. In some examples, aspects of the operations of 1905 may be performed by an access request interface 925 as described with reference to FIG. 9.

At 1910, the method may include receiving, from the access client, an encryption request for encrypting the file, wherein the access package includes the executable code to encrypt the file using the one or more access keys. The operations of 1910 may be performed in accordance with examples as disclosed herein. In some examples, aspects of the operations of 1910 may be performed by an encryption component 945 as described with reference to FIG. 9.

At 1915, the method may include validating the access request using the access information. The operations of 1915 may be performed in accordance with examples as disclosed herein. In some examples, aspects of the operations of 1915 may be performed by a request validation component 930 as described with reference to FIG. 9.

At 1920, the method may include generating, based at least in part on validating the access request, an access package that includes executable code and one or more access keys. The operations of 1920 may be performed in accordance with examples as disclosed herein. In some examples, aspects of the operations of 1920 may be performed by an access package component 935 as described with reference to FIG. 9.

At 1925, the method may include transmitting, to the access client, the access package, wherein the access package is compliable, by the access client, to an executable that is used to access the file. The operations of 1925 may be performed in accordance with examples as disclosed herein. In some examples, aspects of the operations of 1925 may be performed by an access package interface 940 as described with reference to FIG. 9.

At 1930, the method may include transmitting, to the access client, the access package that includes a data pack comprising an indication of one or more file access policies associated with the file, wherein the executable code is configured to encrypt the data pack with the file using the one or more access keys. The operations of 1930 may be performed in accordance with examples as disclosed herein. In some examples, aspects of the operations of 1930 may be performed by an access package interface 940 as described with reference to FIG. 9.

At 1935, the method may include transmitting, to the access client, the access package that includes a data pack comprising the executable code that is configured to generate an audit log associated with the file and encrypt the audit log with the file using the one or more access keys. The operations of 1935 may be performed in accordance with examples as disclosed herein. In some examples, aspects of the operations of 1935 may be performed by an access package component 935 as described with reference to FIG. 9.

Figure 20:
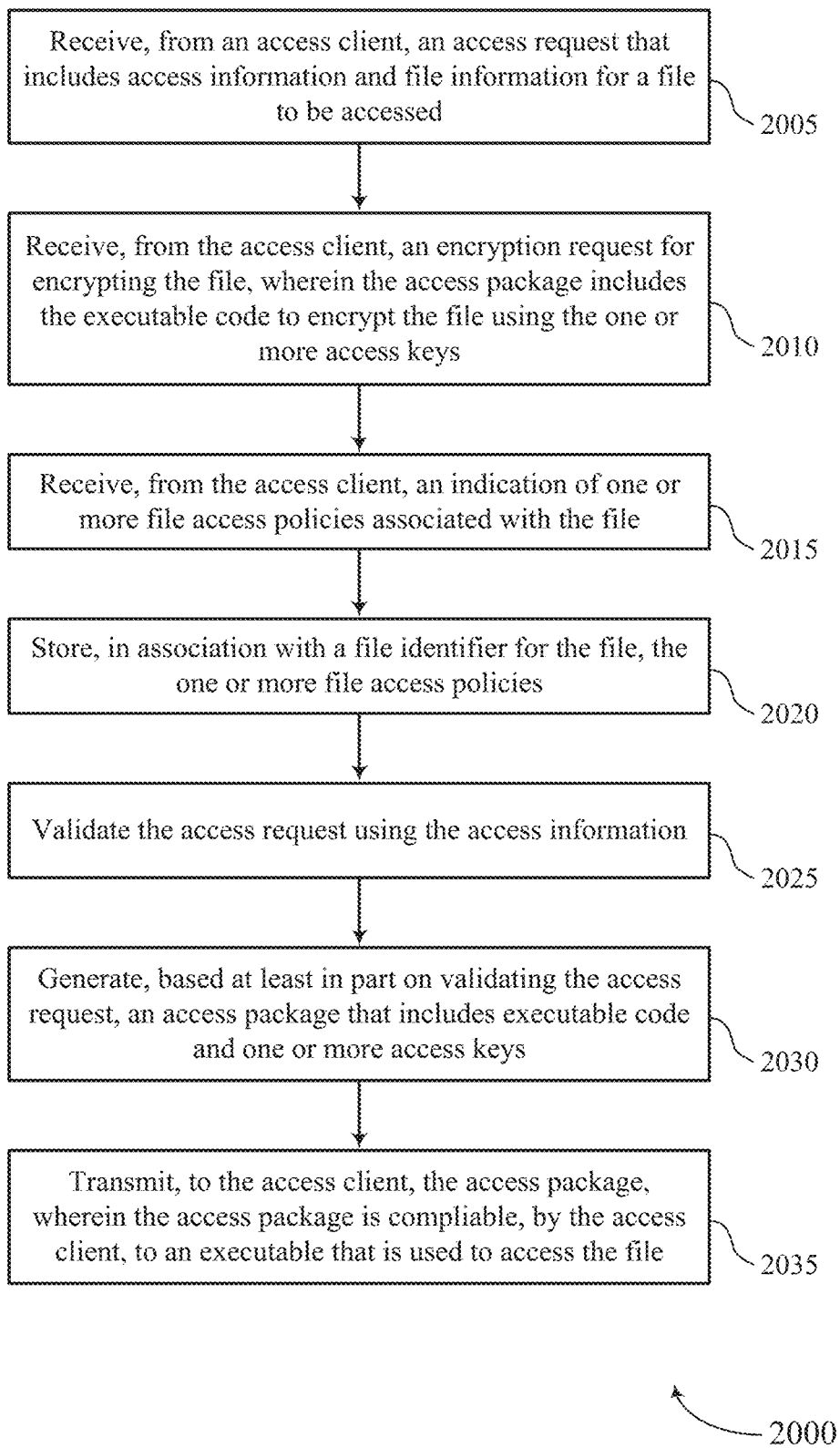

FIG. 20 shows a flowchart illustrating a method 2000 that supports encrypted file control in accordance with aspects of the present disclosure. The operations of the method 2000 may be implemented by a server or its components as described herein. For example, the operations of the method 2000 may be performed by a server as described with reference to FIGS. 1 through 6 and 9 and 10. In some examples, a server may execute a set of instructions to control the functional elements of the server to perform the described functions. Additionally or alternatively, the server may perform aspects of the described functions using special-purpose hardware.

At 2005, the method may include receiving, from an access client, an access request that includes access information and file information for a file to be accessed. The operations of 2005 may be performed in accordance with examples as disclosed herein. In some examples, aspects of the operations of 2005 may be performed by an access request interface 925 as described with reference to FIG. 9.

At 2010, the method may include receiving, from the access client, an encryption request for encrypting the file, wherein the access package includes the executable code to encrypt the file using the one or more access keys. The operations of 2010 may be performed in accordance with examples as disclosed herein. In some examples, aspects of the operations of 2010 may be performed by an encryption component 945 as described with reference to FIG. 9.

At 2015, the method may include receiving, from the access client, an indication of one or more file access policies associated with the file. The operations of 2015 may be performed in accordance with examples as disclosed herein. In some examples, aspects of the operations of 2015 may be performed by a file policy component 960 as described with reference to FIG. 9.

At 2020, the method may include storing, in association with a file identifier for the file, the one or more file access policies. The operations of 2020 may be performed in accordance with examples as disclosed herein. In some examples, aspects of the operations of 2020 may be performed by a file policy component 960 as described with reference to FIG. 9.

At 2025, the method may include validating the access request using the access information. The operations of 2025 may be performed in accordance with examples as disclosed herein. In some examples, aspects of the operations of 2025 may be performed by a request validation component 930 as described with reference to FIG. 9.

At 2030, the method may include generating, based at least in part on validating the access request, an access package that includes executable code and one or more access keys. The operations of 2030 may be performed in accordance with examples as disclosed herein. In some examples, aspects of the operations of 2030 may be performed by an access package component 935 as described with reference to FIG. 9.

At 2035, the method may include transmitting, to the access client, the access package, wherein the access package is compliable, by the access client, to an executable that is used to access the file. The operations of 2035 may be performed in accordance with examples as disclosed herein. In some examples, aspects of the operations of 2035 may be performed by an access package interface 940 as described with reference to FIG. 9.

Figure 21:
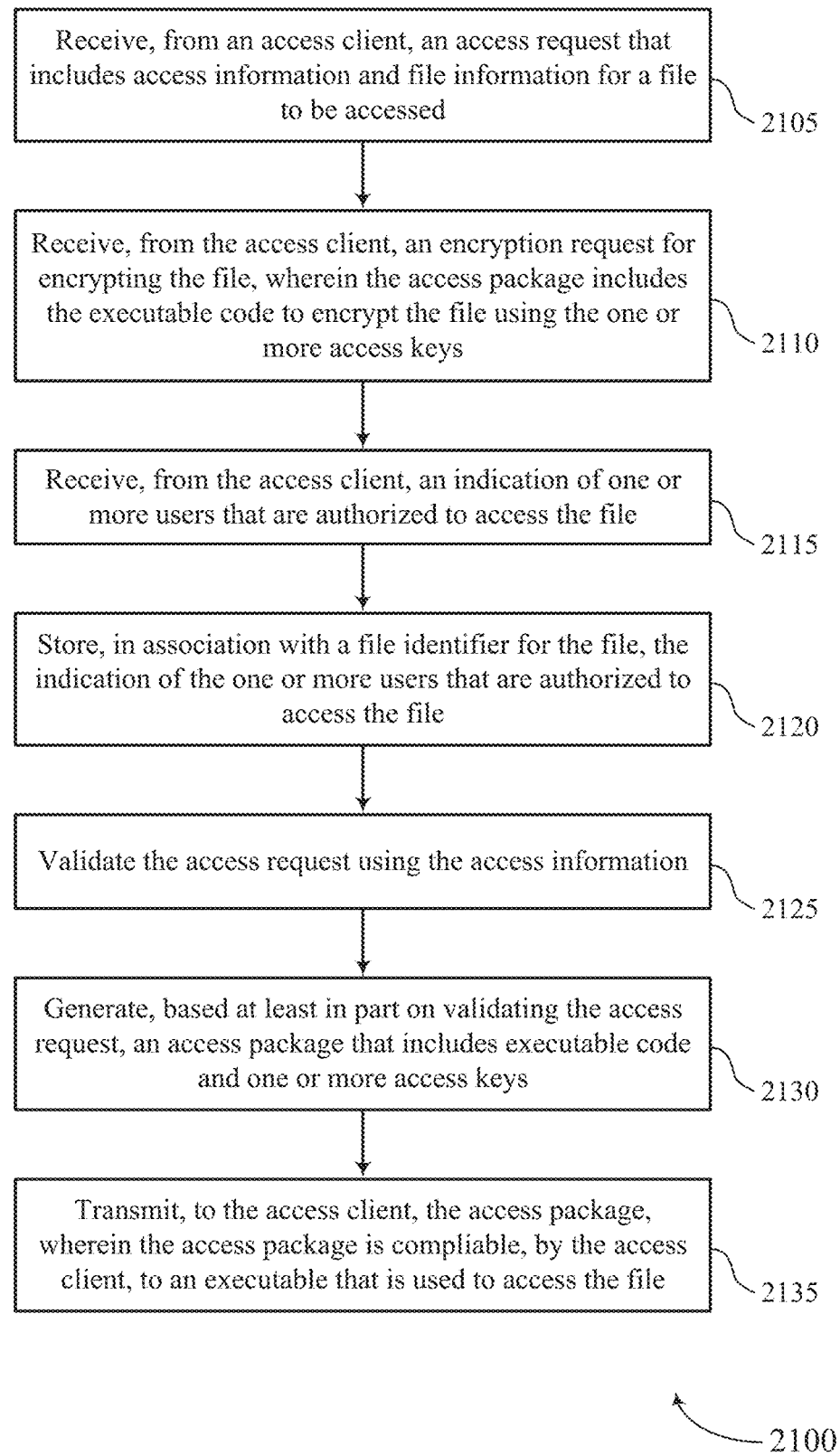

FIG. 21 shows a flowchart illustrating a method 2100 that supports encrypted file control in accordance with aspects of the present disclosure. The operations of the method 2100 may be implemented by a server or its components as described herein. For example, the operations of the method 2100 may be performed by a server as described with reference to FIGS. 1 through 6 and 9 and 10. In some examples, a server may execute a set of instructions to control the functional elements of the server to perform the described functions. Additionally or alternatively, the server may perform aspects of the described functions using special-purpose hardware.

At 2105, the method may include receiving, from an access client, an access request that includes access information and file information for a file to be accessed. The operations of 2105 may be performed in accordance with examples as disclosed herein. In some examples, aspects of the operations of 2105 may be performed by an access request interface 925 as described with reference to FIG. 9.

At 2110, the method may include receiving, from the access client, an indication of one or more users that are authorized to access the file. The operations of 2110 may be performed in accordance with examples as disclosed herein. In some examples, aspects of the operations of 2110 may be performed by a file policy component 960 as described with reference to FIG. 9.

At 2115, the method may include receiving, from the access client, an encryption request for encrypting the file, wherein the access package includes the executable code to encrypt the file using the one or more access keys. The operations of 2115 may be performed in accordance with examples as disclosed herein. In some examples, aspects of the operations of 2115 may be performed by an encryption component 945 as described with reference to FIG. 9.

At 2120, the method may include storing, in association with a file identifier for the file, the indication of the one or more users that are authorized to access the file. The operations of 2120 may be performed in accordance with examples as disclosed herein. In some examples, aspects of the operations of 2120 may be performed by a file policy component 960 as described with reference to FIG. 9.

At 2125, the method may include validating the access request using the access information. The operations of 2125 may be performed in accordance with examples as disclosed herein. In some examples, aspects of the operations of 2125 may be performed by a request validation component 930 as described with reference to FIG. 9.

At 2130, the method may include generating, based at least in part on validating the access request, an access package that includes executable code and one or more access keys. The operations of 2130 may be performed in accordance with examples as disclosed herein. In some examples, aspects of the operations of 2130 may be performed by an access package component 935 as described with reference to FIG. 9.

At 2135, the method may include transmitting, to the access client, the access package, wherein the access package is compliable, by the access client, to an executable that is used to access the file. The operations of 2135 may be performed in accordance with examples as disclosed herein. In some examples, aspects of the operations of 2135 may be performed by an access package interface 940 as described with reference to FIG. 9.

Figure 22:
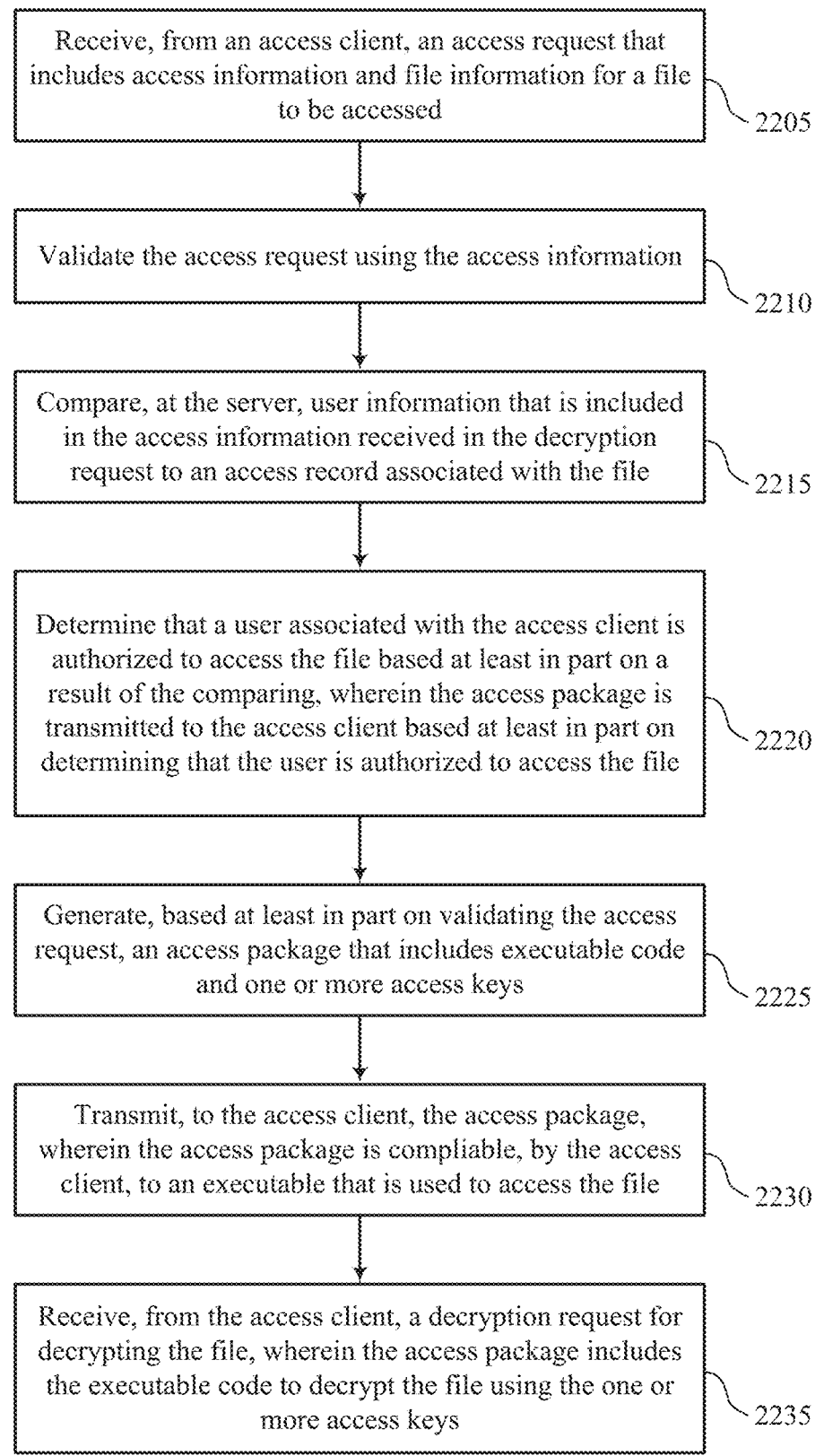

FIG. 22 shows a flowchart illustrating a method 2200 that supports encrypted file control in accordance with aspects of the present disclosure. The operations of the method 2200 may be implemented by a server or its components as described herein. For example, the operations of the method 2200 may be performed by a server as described with reference to FIGS. 1 through 6 and 9 and 10. In some examples, a server may execute a set of instructions to control the functional elements of the server to perform the described functions. Additionally or alternatively, the server may perform aspects of the described functions using special-purpose hardware.

At 2205, the method may include receiving, from an access client, an access request that includes access information and file information for a file to be accessed. The operations of 2205 may be performed in accordance with examples as disclosed herein. In some examples, aspects of the operations of 2205 may be performed by an access request interface 925 as described with reference to FIG. 9.

At 2210, the method may include validating the access request using the access information. The operations of 2210 may be performed in accordance with examples as disclosed herein. In some examples, aspects of the operations of 2210 may be performed by a request validation component 930 as described with reference to FIG. 9.

At 2215, the method may include comparing, at the server, user information that is included in the access information received in the decryption request to an access record associated with the file. The operations of 2215 may be performed in accordance with examples as disclosed herein. In some examples, aspects of the operations of 2215 may be performed by a request validation component 930 as described with reference to FIG. 9.

At 2220, the method may include determining that a user associated with the access client is authorized to access the file based at least in part on a result of the comparing, wherein the access package is transmitted to the access client based at least in part on determining that the user is authorized to access the file. The operations of 2220 may be performed in accordance with examples as disclosed herein. In some examples, aspects of the operations of 2220 may be performed by a request validation component 930 as described with reference to FIG. 9.

At 2225, the method may include generating, based at least in part on validating the access request, an access package that includes executable code and one or more access keys. The operations of 2225 may be performed in accordance with examples as disclosed herein. In some examples, aspects of the operations of 2225 may be performed by an access package component 935 as described with reference to FIG. 9.

At 2230, the method may include transmitting, to the access client, the access package, wherein the access package is compliable, by the access client, to an executable that is used to access the file. The operations of 2230 may be performed in accordance with examples as disclosed herein. In some examples, aspects of the operations of 2230 may be performed by an access package interface 940 as described with reference to FIG. 9.

At 2235, the method may include receiving, from the access client, a decryption request for decrypting the file, wherein the access package includes the executable code to decrypt the file using the one or more access keys. The operations of 2235 may be performed in accordance with examples as disclosed herein. In some examples, aspects of the operations of 2235 may be performed by a decryption component 950 as described with reference to FIG. 9.

Figure 23:
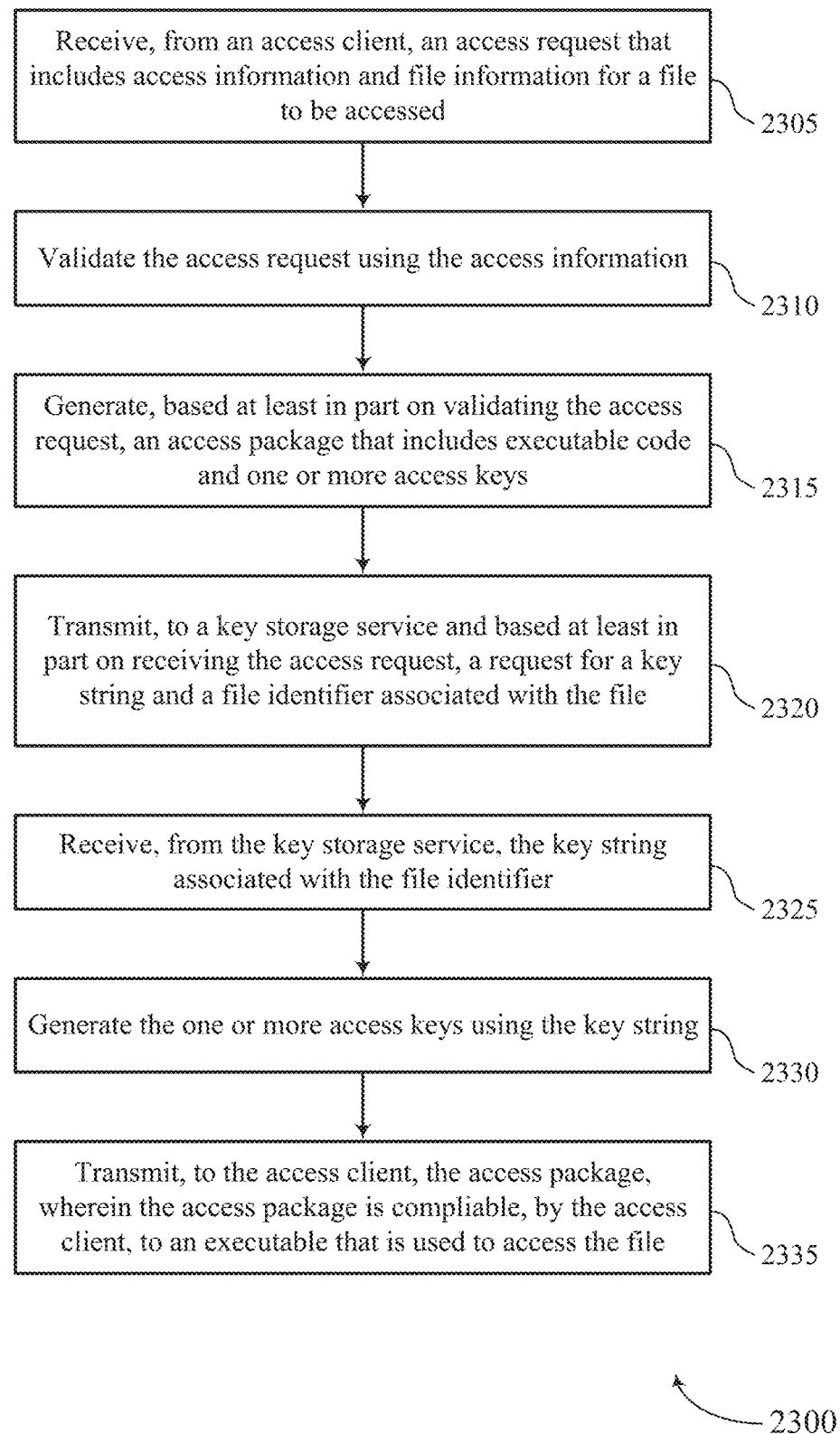

FIG. 23 shows a flowchart illustrating a method 2300 that supports encrypted file control in accordance with aspects of the present disclosure. The operations of the method 2300 may be implemented by a server or its components as described herein. For example, the operations of the method 2300 may be performed by a server as described with reference to FIGS. 1 through 6 and 9 and 10. In some examples, a server may execute a set of instructions to control the functional elements of the server to perform the described functions. Additionally or alternatively, the server may perform aspects of the described functions using special-purpose hardware.

At 2305, the method may include receiving, from an access client, an access request that includes access information and file information for a file to be accessed. The operations of 2305 may be performed in accordance with examples as disclosed herein. In some examples, aspects of the operations of 2305 may be performed by an access request interface 925 as described with reference to FIG. 9.

At 2310, the method may include validating the access request using the access information. The operations of 2310 may be performed in accordance with examples as disclosed herein. In some examples, aspects of the operations of 2310 may be performed by a request validation component 930 as described with reference to FIG. 9.

At 2315, the method may include generating, based at least in part on validating the access request, an access package that includes executable code and one or more access keys. The operations of 2315 may be performed in accordance with examples as disclosed herein. In some examples, aspects of the operations of 2315 may be performed by an access package component 935 as described with reference to FIG. 9.

At 2320, the method may include transmitting, to a key storage service and based at least in part on receiving the access request, a request for a key string and a file identifier associated with the file. The operations of 2320 may be performed in accordance with examples as disclosed herein. In some examples, aspects of the operations of 2320 may be performed by a key identification component 955 as described with reference to FIG. 9.

At 2325, the method may include receiving, from the key storage service, the key string associated with the file identifier. The operations of 2325 may be performed in accordance with examples as disclosed herein. In some examples, aspects of the operations of 2325 may be performed by a key identification component 955 as described with reference to FIG. 9.

At 2330, the method may include generating the one or more access keys using the key string. The operations of 2330 may be performed in accordance with examples as disclosed herein. In some examples, aspects of the operations of 2330 may be performed by a key identification component 955 as described with reference to FIG. 9.

At 2335, the method may include transmitting, to the access client, the access package, wherein the access package is compilable, by the access client, to an executable that is used to access the file. The operations of 2335 may be performed in accordance with examples as disclosed herein. In some examples, aspects of the operations of 2335 may be performed by an access package interface 940 as described with reference to FIG. 9.

A method for data security at an access client is described. The method may include transmitting, to a server, an access request that includes access information and file information for a file to be accessed, receiving, from the server based at least in part on transmitting the access request, an access package that includes executable code and one or more access keys, executing, by the access client, the executable code to access the file using the one or more access keys, and removing the access package from memory associated with the access client.

An apparatus for data security at an access client is described. The apparatus may include a processor, memory coupled with the processor, and instructions stored in the memory. The instructions may be executable by the processor to cause the apparatus to transmit, to a server, an access request that includes access information and file information for a file to be accessed, receive, from the server based at least in part on transmitting the access request, an access package that includes executable code and one or more access keys, execute, by the access client, the executable code to access the file using the one or more access keys, and remove the access package from memory associated with the access client.

Another apparatus for data security at an access client is described. The apparatus may include means for transmitting, to a server, an access request that includes access information and file information for a file to be accessed, means for receiving, from the server based at least in part on transmitting the access request, an access package that includes executable code and one or more access keys, means for executing, by the access client, the executable code to access the file using the one or more access keys, and means for removing the access package from memory associated with the access client.

A non-transitory computer-readable medium storing code for data security at an access client is described. The code may include instructions executable by a processor to transmit, to a server, an access request that includes access information and file information for a file to be accessed, receive, from the server based at least in part on transmitting the access request, an access package that includes executable code and one or more access keys, execute, by the access client, the executable code to access the file using the one or more access keys, and remove the access package from memory associated with the access client.

In some examples of the method, apparatuses, and non-transitory computer-readable medium described herein, and the method, apparatuses, and non-transitory computer-readable medium may include further operations, features, means, or instructions for transmitting, to the server, an encryption request and the file information.

In some examples of the method, apparatuses, and non-transitory computer-readable medium described herein, receiving the access package may include operations, features, means, or instructions for receiving the access package that includes a data pack comprising an indication of one or more file access policies associated with the file, wherein the data pack may be encrypted with the file using the one or more access keys.

In some examples of the method, apparatuses, and non-transitory computer-readable medium described herein, the one or more file access policies include read access, write access, display constraints, or a combination thereof.

In some examples of the method, apparatuses, and non-transitory computer-readable medium described herein, receiving the access package may include operations, features, means, or instructions for receiving the access package that includes a data pack comprising an indication of ownership information associated with the file, wherein the data pack may be encrypted with the file using the one or more access keys.

In some examples of the method, apparatuses, and non-transitory computer-readable medium described herein, transmitting the encryption request may include operations, features, means, or instructions for transmitting, to the server, an indication of one or more file access policies associated the file.

In some examples of the method, apparatuses, and non-transitory computer-readable medium described herein, executing the executable code may include operations, features, means, or instructions for encrypting, using the executable code, a payload and one or more data packs using the one or more access keys to generate an encrypted file.

In some examples of the method, apparatuses, and non-transitory computer-readable medium described herein, encrypting the one or more data packs may include operations, features, means, or instructions for encrypting the one or more data packs that include an indication of one or more file access policies, file ownership information, a file access audit log, or a combination thereof.

In some examples of the method, apparatuses, and non-transitory computer-readable medium described herein, transmitting the access request may include operations, features, means, or instructions for transmitting, to the server, a decryption request and the file information, wherein the executable code includes code that may be used to decrypt the file.

In some examples of the method, apparatuses, and non-transitory computer-readable medium described herein, receiving the access package may include operations, features, means, or instructions for receiving the access package that includes a data pack comprising one or more updated file access policies.

Some examples of the method, apparatuses, and non-transitory computer-readable medium described herein may further include operations, features, means, or instructions for identifying, at the access client, validation information that includes access client information, computer information, device information, geolocation information, an authentication token, or a combination thereof, wherein the decryption request includes an indication of the validation information.

Some examples of the method, apparatuses, and non-transitory computer-readable medium described herein may further include operations, features, means, or instructions for identifying that the file may be associated with the access client based at least in part on metadata associated with the file, wherein the file includes a payload encrypted using a first key of the one or more access keys and one or more encrypted data packs that may be encrypted using at least one second key of the one or more access keys, wherein the decryption request may be transmitted to the server based at least in part on the file being associated with the access client.

In some examples of the method, apparatuses, and non-transitory computer-readable medium described herein, executing the executable code may include operations, features, means, or instructions for decrypting the file using the one or more access keys.

Some examples of the method, apparatuses, and non-transitory computer-readable medium described herein may further include operations, features, means, or instructions for displaying, at the access client, a payload of the file according to one or more access policies associated with the file.

In some examples of the method, apparatuses, and non-transitory computer-readable medium described herein, the one or more access policies include read access, write access, display constraints, or a combination thereof.

In some examples of the method, apparatuses, and non-transitory computer-readable medium described herein, the one or more access policies may be included in a data pack that was decrypted with the file using the one or more access keys.

Some examples of the method, apparatuses, and non-transitory computer-readable medium described herein may further include operations, features, means, or instructions for updating a file access audit log to include device information associated with the access client, user information, geographic location information, or a combination thereof.

Some examples of the method, apparatuses, and non-transitory computer-readable medium described herein may further include operations, features, means, or instructions for identifying, based at least in part on decrypting the file, a payload and one or more data packs in the file, wherein the one or more data packs include an indication of one or more file access policies, ownership information, a file access audit log, or a combination thereof.

Some examples of the method, apparatuses, and non-transitory computer-readable medium described herein may further include operations, features, means, or instructions for instantiating, in the memory associated with the access client and based at least in part on executing the executable code, an access object that may be used to decrypt or encrypt the file, wherein the access object may be removed from the memory associated with the access client after decryption or encryption of the file.

Some examples of the method, apparatuses, and non-transitory computer-readable medium described herein may further include operations, features, means, or instructions for transmitting, to the server, a decryption request and the file information, wherein the executable code includes code that may be used to overwrite contents of the file.

In some examples of the method, apparatuses, and non-transitory computer-readable medium described herein, transmitting the access request may include operations, features, means, or instructions for transmitting the access request that includes the access information comprising a geographical location of a user device executing the access client, device information associated with the user device, network information associated with the user device, an authentication token associated with the access client, or a combination thereof.

A method for data security at a server is described. The method may include receiving, from an access client, an access request that includes access information and file information for a file to be accessed, validating the access request using the access information, generating, based at least in part on validating the access request, an access package that includes executable code and one or more access keys, and transmitting, to the access client, the access package, wherein the access package is compliable, by the access client, to an executable that is used to access the file.

An apparatus for data security at a server is described. The apparatus may include a processor, memory coupled with the processor, and instructions stored in the memory. The instructions may be executable by the processor to cause the apparatus to receive, from an access client, an access request that includes access information and file information for a file to be accessed, validate the access request using the access information, generate, based at least in part on validating the access request, an access package that includes executable code and one or more access keys, and transmit, to the access client, the access package, wherein the access package is compliable, by the access client, to an executable that is used to access the file.

Another apparatus for data security at a server is described. The apparatus may include means for receiving, from an access client, an access request that includes access information and file information for a file to be accessed, means for validating the access request using the access information, means for generating, based at least in part on validating the access request, an access package that includes executable code and one or more access keys, and means for transmitting, to the access client, the access package, wherein the access package is compliable, by the access client, to an executable that is used to access the file.

A non-transitory computer-readable medium storing code for data security at a server is described. The code may include instructions executable by a processor to receive, from an access client, an access request that includes access information and file information for a file to be accessed, validate the access request using the access information, generate, based at least in part on validating the access request, an access package that includes executable code and one or more access keys, and transmit, to the access client, the access package, wherein the access package is compliable, by the access client, to an executable that is used to access the file.

In some examples of the method, apparatuses, and non-transitory computer-readable medium described herein, receiving the access request may include operations, features, means, or instructions for receiving, from the access client, an encryption request for encrypting the file, wherein the access package includes the executable code to encrypt the file using the one or more access keys.

In some examples of the method, apparatuses, and non-transitory computer-readable medium described herein, transmitting the access package may include operations, features, means, or instructions for transmitting, to the access client, the access package that includes a data pack comprising an indication of one or more file access policies associated with the file, wherein the executable code may be configured to encrypt the data pack with the file using the one or more access keys.

In some examples of the method, apparatuses, and non-transitory computer-readable medium described herein, the one or more file access policies comprise read access, write access, display constraints, or a combination thereof.

In some examples of the method, apparatuses, and non-transitory computer-readable medium described herein, transmitting the access package may include operations, features, means, or instructions for transmitting, to the access client, the access package that includes a data pack comprising the executable code that may be configured to generate an audit log associated with the file and encrypt the audit log with the file using the one or more access keys.

In some examples of the method, apparatuses, and non-transitory computer-readable medium described herein, transmitting the access package may include operations, features, means, or instructions for transmitting, to the access client, the access package that includes a data pack comprising an indication of ownership information associated with the file, wherein the executable code may be configured to encrypt the data pack with the file using the one or more access keys.

In some examples of the method, apparatuses, and non-transitory computer-readable medium described herein, receiving the access request may include operations, features, means, or instructions for receiving, from the access client, an indication of one or more file access policies associated with the file and storing, in association with a file identifier for the file, the one or more file access policies.

In some examples of the method, apparatuses, and non-transitory computer-readable medium described herein, receiving the access request may include operations, features, means, or instructions for receiving, from the access client, an indication of one or more users that may be authorized to access the file and storing, in association with a file identifier for the file, the indication of the one or more users that may be authorized to access the file.

In some examples of the method, apparatuses, and non-transitory computer-readable medium described herein, receiving the access request may include operations, features, means, or instructions for receiving, from the access client, a decryption request for decrypting the file, wherein the access package includes the executable code to decrypt the file using the one or more access keys.

Some examples of the method, apparatuses, and non-transitory computer-readable medium described herein may further include operations, features, means, or instructions for determining that a data pack that comprises one or more file access policies for the file may be stale and transmitting, based at least in part on determining that the data pack may be stale, and updated data pack that includes one or more updated file access policies for the file.

Some examples of the method, apparatuses, and non-transitory computer-readable medium described herein may further include operations, features, means, or instructions for comparing, at the server, user information that may be included in the access information received in the decryption request to an access record associated with the file and determining that a user associated with the access client may be authorized to access the file based at least in part on a result of the comparing, wherein the access package may be transmitted to the access client based at least in part on determining that the user may be authorized to access the file.

Some examples of the method, apparatuses, and non-transitory computer-readable medium described herein may further include operations, features, means, or instructions for determining that the access client may be not authorized to decrypt the file based at least in part on the access information received in the decryption request and triggering, at the server, an action based at least in part on determining that the access client may be not authorized to decrypt the file.

In some examples of the method, apparatuses, and non-transitory computer-readable medium described herein, triggering the action may include operations, features, means, or instructions for generating an alert or message indicating that the access client transmitted an unauthorized access request.

In some examples of the method, apparatuses, and non-transitory computer-readable medium described herein, triggering the action may include operations, features, means, or instructions for transmitting the access package that includes the executable code to overwrite contents of the file.

Some examples of the method, apparatuses, and non-transitory computer-readable medium described herein may further include operations, features, means, or instructions for transmitting, to a key storage service and based at least in part on receiving the access request, a request for a key string and a file identifier associated with the file, receiving, from the key storage service, the key string associated with the file identifier, and generating the one or more access keys using the key string.

In some examples of the method, apparatuses, and non-transitory computer-readable medium described herein, validating the access request may include operations, features, means, or instructions for validating the access information that includes a geographical location of a user device executing the access client, device information associated with the user device, network information associated with the user device, an authentication token associated with the access client, for a combination thereof.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for consumer preference and maintenance interface.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The various illustrative blocks and modules described in connection with the disclosure herein may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data security at an access client, comprising:

identifying that a file is associated with the access client based at least in part on metadata associated with the file, wherein the file includes a payload encrypted using a first key of one or more access keys and one or more encrypted data packs that are encrypted using at least one second key of the one or more access keys;

transmitting, to a server, an access request that includes access information and file information for the file to be accessed, wherein transmitting the access request comprises:

transmitting, to the server, a decryption request and the file information, wherein the decryption request is transmitted to the server based at least in part on the file being associated with the access client;

receiving, from the server based at least in part on transmitting the access request, an access package that includes executable code and the one or more access keys, wherein the executable code includes code that is used to decrypt the file;

executing, by the access client, the executable code to access the file using the one or more access keys; and removing the access package from memory associated with the access client.

2. The method of claim 1, wherein transmitting the access request comprises:

transmitting, to the server, an encryption request and the file information.

3. The method of claim 2, wherein receiving the access package comprises:

receiving the access package that includes a data pack comprising an indication of one or more file access policies associated with the file, wherein the data pack is encrypted with the file using the one or more access keys.

4. The method of claim 3, wherein the one or more file access policies include read access, write access, display constraints, or a combination thereof.

5. The method of claim 2, wherein receiving the access package comprises:

receiving the access package that includes a data pack comprising an indication of ownership information associated with the file, wherein the data pack is encrypted with the file using the one or more access keys.

6. The method of claim 2, wherein transmitting the encryption request comprises:

transmitting, to the server, an indication of one or more file access policies associated the file.

7. The method of claim 2, wherein executing the executable code comprises:

encrypting, using the executable code, a payload and one or more data packs using the one or more access keys to generate an encrypted file.

8. The method of claim 7, wherein encrypting the one or more data packs comprises:

encrypting the one or more data packs that include an indication of one or more file access policies, file ownership information, a file access audit log, or a combination thereof.

9. The method of claim 1, wherein receiving the access package comprises:

receiving the access package that includes a data pack comprising one or more updated file access policies.

10. The method of claim 1, further comprising:

identifying, at the access client, validation information that includes access client information, computer information, device information, geolocation information, an authentication token, or a combination thereof, wherein the decryption request includes an indication of the validation information.

11. The method of claim 1, further comprising:

instantiating, in the memory associated with the access client and based at least in part on executing the executable code, an access object that is used to decrypt or encrypt the file, wherein the access object is removed from the memory associated with the access client after decryption or encryption of the file.

12. The method of claim 1, further comprising:

transmitting, to the server, a decryption request and the file information, wherein the executable code includes code that is used to overwrite contents of the file.

13. The method of claim 1, wherein transmitting the access request comprises:

transmitting the access request that includes the access information comprising a geographical location of a user device executing the access client, device information associated with the user device, network information associated with the user device, an authentication token associated with the access client, or a combination thereof.

14. The method of claim 1, wherein executing the executable code comprises:

decrypting the file using the one or more access keys.

15. The method of claim 14, further comprising:

displaying, at the access client, a payload of the file according to one or more access policies associated with the file.

16. The method of claim 15, wherein the one or more access policies include read access, write access, display constraints, or a combination thereof.

17. The method of claim 15, wherein the one or more access policies are included in a data pack that was decrypted with the file using the one or more access keys.

18. The method of claim 14, further comprising:

updating a file access audit log to include device information associated with the access client, user information, geographic location information, or a combination thereof.

19. The method of claim 14, further comprising:

identifying, based at least in part on decrypting the file, a payload and one or more data packs in the file, wherein the one or more data packs include an indication of one or more file access policies, ownership information, a file access audit log, or a combination thereof.

20. An apparatus for data security at an access client, comprising:

a processor;

memory coupled with the processor; and instructions stored in the memory and executable by the processor to cause the apparatus to:

identify that a file is associated with the access client based at least in part on metadata associated with the file, wherein the file includes a payload encrypted using a first key of one or more access keys and one or more encrypted data packs that are encrypted using at least one second key of the one or more access keys;

transmit, to a server, an access request that includes access information and file information for the file to be accessed, wherein transmitting the access request comprises:
  transmitting, to the server, a decryption request and the file information, wherein the decryption request is transmitted to the server based at least in part on the file being associated with the access client;
  receive, from the server based at least in part on transmitting the access request, an access package that includes executable code and the one or more access keys, wherein the executable code includes code that is used to decrypt the file;
  execute, by the access client, the executable code to access the file using the one or more access keys; and
  remove the access package from memory associated with the access client.

21. A non-transitory computer-readable medium storing code for data security at an access client, the code comprising instructions executable by a processor to:
  identify that a file is associated with the access client based at least in part on metadata associated with the file, wherein the file includes a payload encrypted using a first key of one or more access keys and one or more encrypted data packs that are encrypted using at least one second key of the one or more access keys;
  transmit, to a server, an access request that includes access information and file information for the file to be accessed, wherein transmitting the access request comprises:
    transmitting, to the server, a decryption request and the file information, wherein the decryption request is transmitted to the server based at least in part on the file being associated with the access client;
  receive, from the server based at least in part on transmitting the access request, an access package that includes executable code and the one or more access keys, wherein the executable code includes code that is used to decrypt the file;
  execute, by the access client, the executable code to access the file using the one or more access keys; and
  remove the access package from memory associated with the access client.

* * * * *